United States Patent
Stern et al.

(10) Patent No.: US 8,258,953 B2
(45) Date of Patent: Sep. 4, 2012

(54) DISPLAYING RADIO FREQUENCY IDENTIFICATION (RFID) READ RANGE OF AN RFID READER BASED ON FEEDBACK FROM FIXED RFID BEACON TAGS

(75) Inventors: Miklos Stern, Woodmere, NY (US); Benjamin Bekrisky, Modiin (IL)

(73) Assignee: Symbol Technologies, Inc., Holtsville, NY (US)

( * ) Notice: Subject to any disclaimer, the term of this patent is extended or adjusted under 35 U.S.C. 154(b) by 538 days.

(21) Appl. No.: 12/369,838

(22) Filed: Feb. 12, 2009

(65) Prior Publication Data
US 2010/0201488 A1 Aug. 12, 2010

(51) Int. Cl.
G08B 13/14 (2006.01)
(52) U.S. Cl. .................. 340/572.1; 340/572.4; 340/10.1
(58) Field of Classification Search ................. 340/572.1
See application file for complete search history.

(56) References Cited

U.S. PATENT DOCUMENTS

| | | | |
|---|---|---|---|
| 6,232,870 B1 * | 5/2001 | Garber et al. ................. | 340/10.1 |
| 7,161,470 B2 * | 1/2007 | Berquist et al. ............ | 340/10.31 |
| 2005/0246094 A1 * | 11/2005 | Moscatiello .................. | 701/207 |
| 2006/0187045 A1 * | 8/2006 | Heinze et al. ............... | 340/572.1 |
| 2007/0099623 A1 * | 5/2007 | Stephensen et al. .......... | 455/446 |
| 2008/0284600 A1 * | 11/2008 | Drzaic et al. ............... | 340/572.1 |
| 2009/0322532 A1 * | 12/2009 | Malik ......................... | 340/572.1 |
| 2010/0019882 A1 | 1/2010 | Stern et al. | |

* cited by examiner

*Primary Examiner* — George Bugg
*Assistant Examiner* — Kerri McNally
(74) *Attorney, Agent, or Firm* — Bartholomew DiVita; Terri Hughes Smith; Kenneth A. Haas

(57) ABSTRACT

The present disclosure describes a system, methods and apparatus for displaying read range of a nomadic Radio Frequency Identification (RFID) reader based on feedback from fixed RFID beacon tags. For instance, the nomadic RFID reader can transmit an interrogation signal within a space that includes a plurality of fixed RFID beacon tags at known locations, and can receive response signals from a group of the fixed RFID beacon tags. Based on known locations of the group of fixed RFID beacon tags, a read range of the RFID reader can be determined. The read range is defined by the group of the fixed RFID beacon tags. The read range of the nomadic RFID reader can then be displayed on a display along with other information about the fixed RFID beacon tags and/or RFID item tags that are within the read range of the nomadic RFID reader.

25 Claims, 19 Drawing Sheets

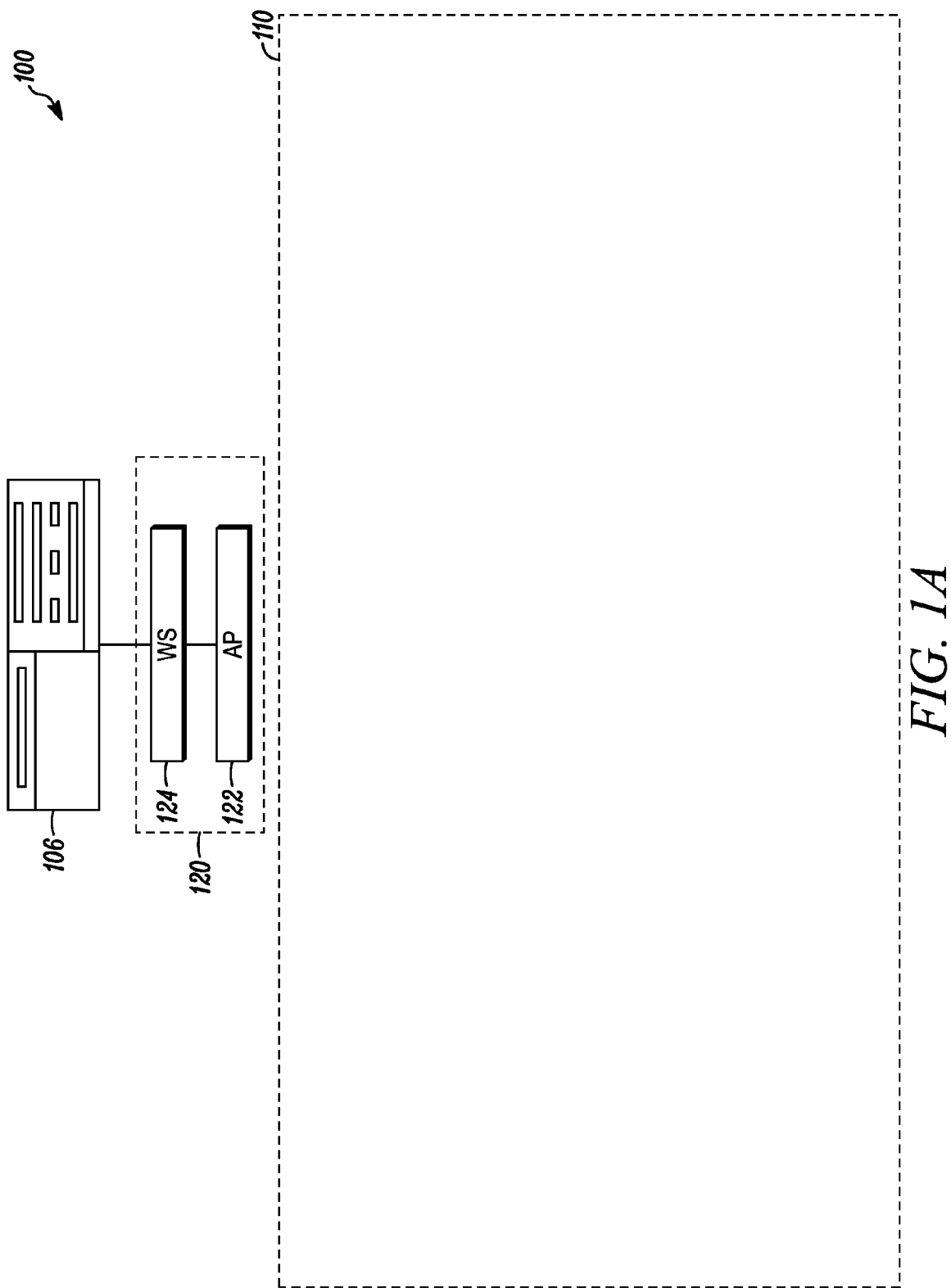

DISPLAYING RADIO FREQUENCY IDENTIFICATION (RFID) READ RANGE OF AN RFID READER BASED ON FEEDBACK FROM FIXED RFID BEACON TAGS

TECHNICAL FIELD

Embodiments of the subject matter described herein relate generally to radio-frequency identification (RFID). More particularly, embodiments of the subject matter relate to RFID systems, methods, and readers.

BACKGROUND

Radio frequency identification (RFID) systems have achieved wide popularity in a number of applications, as they provide a cost-effective way to track the location of a large number of items in real time. Most RFID systems includes two primary components: an RFID reader (also known as an interrogator or RFID reader device); and one or more RFID tags (also known as RFID transponders). The RFID reader generates or emits a radio-frequency (RF) interrogation signal (sometimes also called a polling signal). The RFID tag is a miniature device that is capable of responding to the RF interrogation signal by generating an RF response signal that is transmitted back to the RFID reader over an RF channel. The RF response signal is modulated in a manner that conveys identification data (i.e., a tag identifier (ID)) for the responding RFID tag back to the RFID reader. In large-scale applications, such as warehouses, retail spaces, and the like, many types of RFID tags may exist in the environment (or "site"). Likewise, multiple types of readers, such as RFID readers, active tag readers, 802.11 tag readers, Zigbee tag readers, etc., are typically used throughout the space, and may be linked by network controller or wireless switches and the like.

RFID systems are used in a number of different applications such as object tracking, security, inventory control/ tracking in retail stores, warehouses, shipping centers, etc. For instance, in one inventory tracking application, some retails stores have begun using the RFID technology to track the location of items/inventory/articles/merchandise present in the store. In such applications, each item has an RFID tag attached to it so that the sales staff does not need to scan every item to check inventory, but rather can check items on a shelf using an RFID reader and/or receive an item inventory report. This generally saves time, but still involves human intervention.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 1A through 1D illustrate a Radio Frequency Identification (RFID) system in accordance with some embodiments of the present disclosure;

DETAILED DESCRIPTION

Figure 1B:
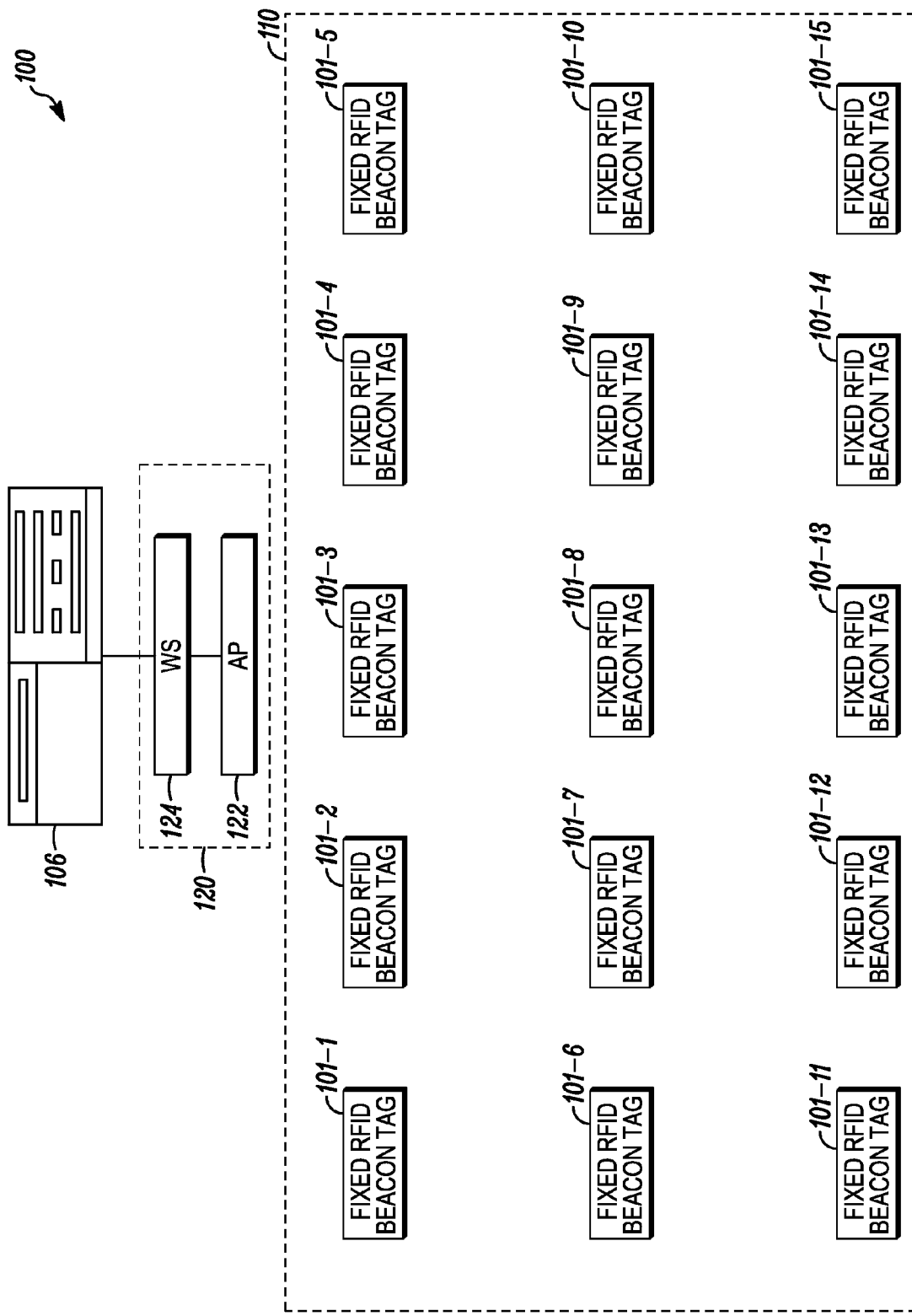

The following detailed description is merely illustrative in nature and is not intended to limit the embodiments of the invention or the application and uses of such embodiments. Furthermore, there is no intention to be bound by any expressed or implied theory presented in the preceding technical field, background, or the following detailed description.

Some embodiments of the present disclosure relate generally to displaying Radio Frequency Identification (RFID) read range of an RFID reader based on feedback from RFID beacon tags, and determining item location based on feedback from RFID readers and/or RFID beacon tags, and to determine coverage based on feedback from RFID beacon tags. The many alternative embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission protocols and that the system described herein is merely one example embodiment of the invention.

For the sake of brevity, conventional techniques related to radio-frequency identification (RFID) data transmission, RFID system architectures, computing device architectures, and other functional aspects of the systems (and the individual operating components of the systems) may not be described in detail herein. Furthermore, the connecting lines shown in the various figures contained herein are intended to represent example functional relationships between the various elements. It should be noted that many alternative or additional functional relationships or physical connections may be present in a practical embodiment.

The following description may refer to elements or nodes or features being "connected" or "coupled" together. As used herein, unless expressly stated otherwise, "connected" means that one element/node/feature/device is directly communicates with another element/node/feature/device. Likewise, unless expressly stated otherwise, "coupled" means that one element/node/feature/device directly or indirectly communicates with another element/node/feature/device. For example, although the schematic shown in FIG. 2, described below, depicts one example arrangement of an RFID reader, additional intervening elements, devices, features, or components may be present in an embodiment of the invention.

Overview

Because RFID tags respond via radio-frequency transmissions, an operator of a RFID reader knows which tag transmitted a particular response signal, but can not determine the position of the RFID tag that generated that response signal (e.g., how far from the RFID reader the RFID tag is, or in which direction from the RFID reader the response signal emanates). Accordingly, it can be difficult to determine position and distance properties of RFID tags.

Each RFID reader has a limited read range that defines a coverage space (area) of that RFID reader. When polling or "interrogating" RFID tags, such as those attached to items, an RFID reader does not provide its operator with feedback regarding the "read range" covered by the RFID reader or which RFID tags are being interrogated. This can be a problem, for example, when an operator is interested in reading RFID item tags of items on one shelf, but the RFID reader is actually also receiving response signals from another RFID item tag located on another shelf It goes without saying that operator satisfaction would be greatly improved by providing the operator with accurate feedback about read range of a particular RFID reader, the relative location of particular items attached to particular RFID item tags, etc. This feedback makes using such RFID readers more intuitive for the operator.

Accordingly, it is desirable to provide improved methods and systems for displaying read range of a Radio Frequency Identification (RFID) reader. It is also desirable to provide improved RFID systems and methods for determining location(s) of item(s) within a space. It is also desirable to provide improved RFID systems and methods for verifying RFID reader coverage within a space or a portion of the space. It would also be desirable if such RFID systems are easy to deploy, maintain and operate.

According to one embodiment, a method is provided for displaying read range of a Radio Frequency Identification (RFID) reader based on feedback from fixed RFID beacon tags. In accordance with one exemplary embodiment of this method, the RFID reader transmits a first interrogation signal within a space that includes a plurality of fixed RFID beacon tags at known locations, and receives response signals from a first group of the fixed RFID beacon tags. Based on known locations of the first group of fixed RFID beacon tags, a read range of the RFID reader can be determined. The read range is defined by the first group of the fixed RFID beacon tags. The read range of the RFID reader can then be displayed on a display of the RFID reader along with other information about the fixed RFID beacon tags and/or RFID item tags that are within the read range of the RFID reader.

In accordance with another embodiment of the present disclosure, an RFID system and method are provided for determining location of an item within a space. Each particular item is associated with a particular RFID item tag that uniquely identifies the particular item. A plurality of fixed Radio Frequency Identification (RFID) readers are provided in the space, and each of the fixed RFID readers is fixed at a particular known location within the space. Each of the fixed RFID readers can transmit an interrogation signal. Upon receiving a first interrogation signal from one of the fixed RFID readers (referred to below as a "first fixed RFID reader"), a first RFID item tag transmits a response signal. The first fixed RFID reader receives the response signal transmitted by the first RFID item tag, and can therefore determine that the first RFID item tag (and hence the item it is attached to) is located within a read range of the first fixed RFID reader. This "read range" is a first RF coverage area of the first fixed RFID reader within the space. In addition, any other RFID tags that receive the first interrogation signal (or one of the interrogation signals transmitted by another fixed RFID reader can also transmit a response signal, and any fixed RFID readers that receive a response signal can determine that the RFID tag that transmitted it is within its coverage area or "read range." Using this system, an operator can also conduct a search for specific items of merchandise in the retail store. The operator can issue a command to look for a particular item, and the RFID readers can poll their vicinity to determine whether the item is found within its coverage area or read range. The RFID readers can be used to easily locate items on the sales floor.

In accordance with another embodiment of the present disclosure, a method is provided for verifying RFID reader coverage of a space. A plurality of fixed RFID readers are placed at known locations within the space and a plurality of fixed RFID beacon tags are placed within the space. The fixed RFID readers each transmit interrogation signals, and in response thereto, at least some of the fixed RFID beacon tags transmit response signals upon receiving one of the interrogation signals. The RFID beacon tags can also be used to verify coverage of the distributed RFID readers for the entire space or environment since at least one of the RFID readers should be within communication range of each of the fixed RFID beacon tags. If there are any RFID beacon tags not read by the RFID readers, then coverage is incomplete or inadequate. At least some of the fixed RFID readers can then receive response signals from at least some of the fixed RFID beacon tags, can extract identification information from the response signals, and can communicate the identification information to a monitoring server. The monitoring server can then verify that the fixed RFID readers provide full coverage of the space by determining whether identification information for all of the fixed RFID beacon tags was received by at least one of the fixed RFID readers. The monitoring server determines that the fixed RFID readers provide full coverage of the space when all of the fixed RFID beacon tags that are deployed within the space are confirmed to have transmitted a response signal that was received by at least one of the fixed RFID readers. By contrast, the monitoring server determines that the fixed RFID readers do not provide full coverage of the space when it is confirmed that one or more of the fixed RFID beacon tags did not transmit a response signal that was received by at least one of the fixed RFID readers. Additional RFID readers can be added to the area(s) where the unread RFID beacon tag(s) is/are located. Retailers can easily set up and ensure full coverage of their system, without requiring site surveys. Another important feature of the system is that it is easily reconfigurable since the RFID readers are completely wireless since they operate via battery power and communicate wirelessly. The RFID readers can be moved at any time to any location since the system is completely wireless and there are no cables. As such, the need for professional installation can be eliminated. The approximate location of the fixed RFID readers is "known" based on locations of particular ones of the fixed RFID beacon tags that they have received response signals from. The fixed RFID beacon tags help in self-locating of the RFID readers when the RFID readers are relocated to a new position so the user does not need to keep track of the reader locations, as long as he has a map of the fixed beacon tags.

In accordance with another embodiment of the present disclosure, an RFID system and method are provided for determining item location within a space based on feedback from a fixed Radio Frequency Identification (RFID) reader and fixed RFID beacon tags. A first interrogation signal is transmitted from a first fixed RFID reader at a first transmit power. The first fixed RFID reader is fixed at a first known location/position/coordinates within the space. Upon receiving the first interrogation signal, RFID tags that are within transmission range of the first fixed RFID reader and have received the first interrogation signal can transmit response signals. These RFID tags can include fixed RFID beacon tags and RFID item tags. Each of the RFID item tags can be attached to an item (e.g., article of merchandise or inventory). Each response signal uniquely identifies the transmitting RFID tag. In one implementation that will be described below, these RFID tags can include a first set of fixed RFID beacon tags and a first set of RFID item tags, and each of the first set of fixed RFID beacon tags and the first set of RFID item tags can transmit a response signal in response to receiving the first interrogation signal. In one implementation, the first set of RFID item tags comprises at least a first RFID item tag. A first coverage area of the first fixed RFID reader can then be defined based on the first known location of the first fixed RFID reader and the first set of fixed RFID beacon tags, and it can be determined that the first set of RFID item tags are located within the first coverage area of the first fixed RFID reader. The first coverage area of the first fixed RFID reader can be defined, for example, by either the first fixed RFID reader or another entity such as monitoring server. Each of the fixed RFID beacon tags can be fixed (at known locations/positions/coordinates that are known to the fixed RFID readers and/or monitoring server), and the first coverage area of the first fixed RFID reader can be defined based on the first known location of the first fixed RFID reader and the other known locations of the first set of fixed RFID beacon tags.

Although fixed RFID readers can be used to determine the relative position of particular RFID item tags that are within its read range there is no easy way to determine (and/or display) the read range of the RFID readers. Instead, a system must estimate that an RFID reader has a read range X and that if an RFID item tag responds to an interrogation signal, then that item must be located within a distance X (equal to the read range) of that particular RFID reader. While that is a good approach, it would be desirable to enhance accuracy or precision of the item location determination. Feedback information from the RFID beacon tags can allow the system to determine and/or display the general position/location of a particular RFID item tag. In still other embodiments of the present disclosure, the first fixed RFID reader (and any other fixed RFID reader) can adjust its "coverage area" or "read range" by transmitting other interrogation signals at a higher and/or lower transmit powers.

For example, to decrease its coverage area or read range, the first fixed RFID reader can transmit a "second" interrogation signal that has a lower transmit power than the first transmit power of the first interrogation signal. In response to the second interrogation signal, a second set of fixed RFID beacon tags and/or a second set of RFID item tags can transmit response signals upon receiving the second interrogation signal. In some deployment scenarios, the second set of fixed RFID beacon tags will include at least some of the first set of fixed RFID beacon tags, and the second set of RFID item tags will include at least some of the first set of RFID item tags. Based on the first known location of the first fixed RFID reader and the second set of fixed RFID beacon tags, a second coverage area of the first fixed RFID reader can be defined (by either the first fixed RFID reader or another entity such as monitoring server), and it can be determined that the second set of RFID item tags are also located within the second coverage area of the first fixed RFID reader.

By contrast, to increase its coverage area or read range, the first fixed RFID reader can transmit a "third" interrogation signal that has a higher transmit power than the first transmit power of the first interrogation signal. In this case, a third set of fixed RFID beacon tags and/or a third set of RFID item tags can transmit response signals upon receiving the third interrogation signal, and the third set of fixed RFID beacon tags will include all of the first set of fixed RFID beacon tags possibly along with additional fixed RFID beacon tags that are within range of the third interrogation signal, and the third set of RFID item tags will includes all of the first set of RFID item tags possibly along with additional RFID item tags that are within range of the third interrogation signal. This way, a third coverage area of the first fixed RFID reader can be defined (by either the first fixed RFID reader or another entity such as monitoring server) based on the first known location of the first fixed RFID reader and the third set of fixed RFID beacon tags, and it can be determined that the third set of RFID item tags are located within the third coverage area of the first fixed RFID reader. As above, in some implementations, the third set of fixed RFID beacon tags can be fixed at known locations, and the third coverage area can be defined based on the first known location of the first fixed RFID reader and the known locations of the third set of fixed RFID beacon tags.

As will be appreciated, any number of other fixed RFID readers can be placed at other known locations within the space and can perform the same methods to determine their read ranges or coverage areas. For instance, a second fixed RFID reader can be provided at a second known location within the space, and can transmit an interrogation signal, and another set of fixed RFID beacon tags and/or another set of RFID item tags can transmit response signals upon receiving this interrogation signal. As above, a coverage area of the second fixed RFID reader can be defined based on the second known location of the second fixed RFID reader and the other set of fixed RFID beacon tags, and it can be determined that this other set of RFID item tags are located within the coverage area of the second fixed RFID reader.

With proper deployment of fixed RFID readers throughout the space, the RFID readers can be distributed to collectively cover the entire space or environment. Full RFID reader coverage throughout the space can be ensured and verified using the coverage verification methods described above. In one implementation, to enable easy deployment of such RFID systems, each of the fixed RFID readers are battery-powered by a battery, and each of the batteries is rechargeable via ambient lighting. Moreover, the RFID readers communicate with RFID tags via RFID interrogation signals and with infrastructure (e.g., backend servers) via WLAN communication signals, for example, thereby eliminating the need for any wired connections.

According to one exemplary implementation, embodiments described above can be implemented in a retail store. Fixed RFID readers can be distributed throughout the retail store and can aid in locating merchandise on the retail floor. Knowing which RFID reader is able to read the particular RFID item tag provides information about the general location of the particular RFID item tag. This system can also allow for a map to be created that displays the whereabouts of all the RFID tagged items with reasonable accuracy (e.g., within the read range of a specific RFID reader). In some implementations, RFID beacon tags can be distributed throughout the retail space or environment, and knowing the locations of these RFID beacon tags helps identify the location of particular RFID item tags that are nearby with greater precision. This knowledge can be used to create a map of items and their relative locations in the retail store. The approximate location of the RFID readers can also be obtained by knowing which RFID beacon tags respond to its interrogation signal. Among other things, this allows an organization to take inventory fully automatically without human intervention. There may be tags that cannot be read, either due to their orientation or due to close proximity between tags. To minimize this problem several polls can be done in a given time period so that RFID tags that were unreadable during one polling, will be readable another time. Furthermore, data from several polls can be combined to create a good estimate of the actual inventory. In some implementations, poll data can be combined with expected inventory information on the floor, as well as with sold item records from the checkout register to provide a highly accurate picture of the state and location of the retail store inventory, even if each individual poll is less than 100% accurate. If RFID item tags respond to more than one RFID readers' interrogation signal, that information can be used to further help in identifying the location of those items. For instance, if an RFID tag responds to two adjacent readers, then it is most likely located in the area where the coverage areas of the two reader overlap.

Other desirable features and characteristics of the present invention will become apparent from the subsequent detailed description and the appended claims, taken in conjunction with the accompanying drawings. Prior to describing some embodiments with reference to FIGS. 4A-8, an example of an RFID system in which these embodiments can be applied will now be described with reference to FIGS. 1A-1D, an example of an RFID reader and nearby RFID tag will then be described with reference to FIG. 2, and an example of a monitoring server will then be described with reference to FIG. 3.

Exemplary RFID System

FIGS. 1A-1D illustrate an RFID system 100 in accordance with some embodiments of the present disclosure.

As illustrated in FIG. 1A, the RFID system 101 includes a monitoring server 106, a space or environment 110, and infrastructure devices 120 coupled to the monitoring server 106 via a wired or wireless communication link. In one implementation, the infrastructure devices 120 can be implemented via one or more access points or access ports 122 that are coupled to a wireless switch device 124. The infrastructure devices 120 are optional since they are not used in some implementations. For example, the infrastructure devices 120 are not used in implementations where the fixed RFID readers 104 are directly connected to the monitoring server 106 via wired connections. In addition, in other implementations, the functionality of the monitoring server 106 that is described below can be implemented at one of the fixed RFID readers 104, and the fixed RFID readers can form an ad hoc network in which the fixed RFID readers communicate directly with each other over wireless communication links.

The space or environment 110 can be located within a building or other site (alternatively referred to as an "environment"). Note that while a single two-dimensional space or environment 110 is illustrated in FIG. 1, the invention is not so limited. That is, environment 110 may be any two-dimensional or three-dimensional space within or without a building and other structure. Example environments include, for example, single-story buildings, multi-story buildings, school campuses, commercial buildings, retail spaces, warehouses, and the like structures.

As illustrated in FIG. 1B, fixed RFID beacon tags 101 can be placed or distributed at fixed locations/positions/coordinates within the space or environment 110. Fixed RFID beacon tags 101 may be positioned throughout environment 110. The fixed RFID beacon tags 101 can be positioned or distributed with a density and number that is appropriate given the power of the RFID tags as well as structural details (e.g., internal architecture) of environment 110. The fixed RFID beacon tags 101 may be distributed evenly throughout the site (e.g., in a grid), or may be randomly distributed or may be distributed as a function of item density in particular locations of the space or environment 110. In the illustrated embodiment, for example, multiple beacon tags 101 are distributed to ensure the environment is mapped with sufficient precision/granularity to allow for RFID item tags 102 to be located, but any number of beacon tags 101 can be used depending upon the size, layout and other factors that characterize the environment 110 with sufficient precision/granularity to allow for RFID item tags 102 to be located.

Each fixed RFID beacon tag 101 stores data that can be read by RFID reader 104 including identification information (e.g., a tag ID) and optionally location information (e.g., coordinates of the RFID tag that identify its position within the environment 110, etc.) in some implementations. The particular known position can be determined by technologies and methods such as GPS location determination, dead-reckoning, manual input or any other technique, and specified using a Cartesian or other coordinate systems. This allows a map of the environment 110 to be established and stored at the RFID readers 104 and the monitoring server 106.

Figure 1C:
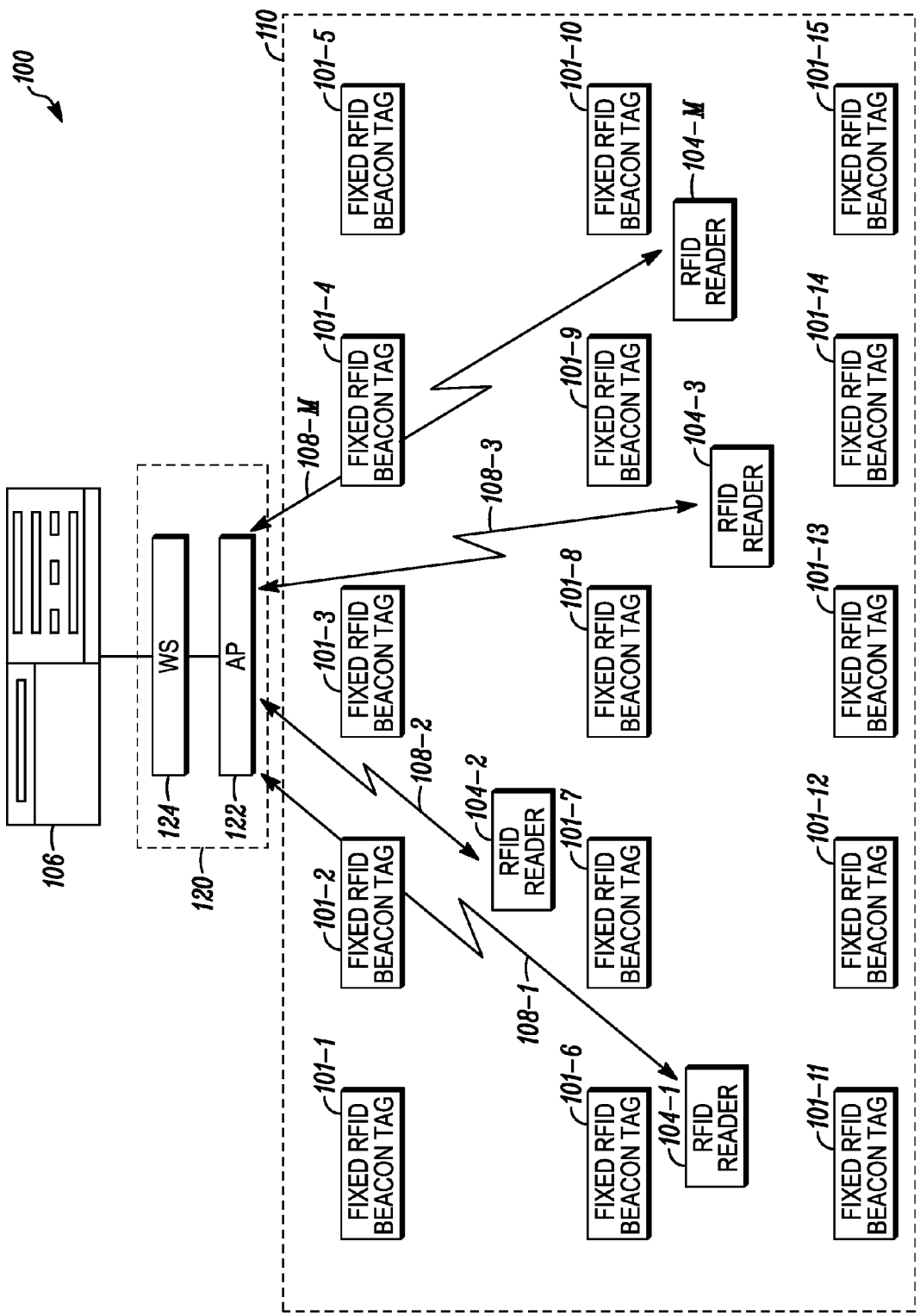

As illustrated in FIG. 1C, in some implementations, fixed RFID readers 104 can be placed or distributed at fixed locations/positions/coordinates within the space or environment 110. The fixed RFID readers 104-1 to 104-M can be any known type of RFID reader device. One exemplary implementation of an RFID reader is disclosed, for example, in United States Patent Application 20100019882, entitled "Radio Frequency Identification Reader With Illuminated Field of View" filed Jul. 23, 2008 and assigned to the assignee of the present invention, its contents being incorporated by reference in its entirety herein. In accordance with one embodiment of the present disclosure, the fixed RFID readers 104 can be distributed throughout the space or environment 110 such that they can scan and interrogate the RFID tags present therein. The fixed RFID readers 104 can interrogate any nearby RFID tags 101, 102, receive response signals from the RFID tags, which include relevant tag data including identification information for each RFID tag, and can wirelessly send the relevant tag data via wireless communication links 108-1 to 108-M to one or more wireless access ports (APs) 122 and/or a switching device 124 that can be located remotely from RFID readers 104 and coupled to the monitoring server 106. It is to be appreciated that other RFID readers (not illustrated) can be used in the system 100, for example by employees, and these RFID readers are nomadic or can be moved around the environment 110, in which case the monitoring server 106 can not rely on their location as being fixed. The fixed RFID readers 104 can communicate wirelessly with both the RFID tags and the AP(s) 122.

Figure 1D:
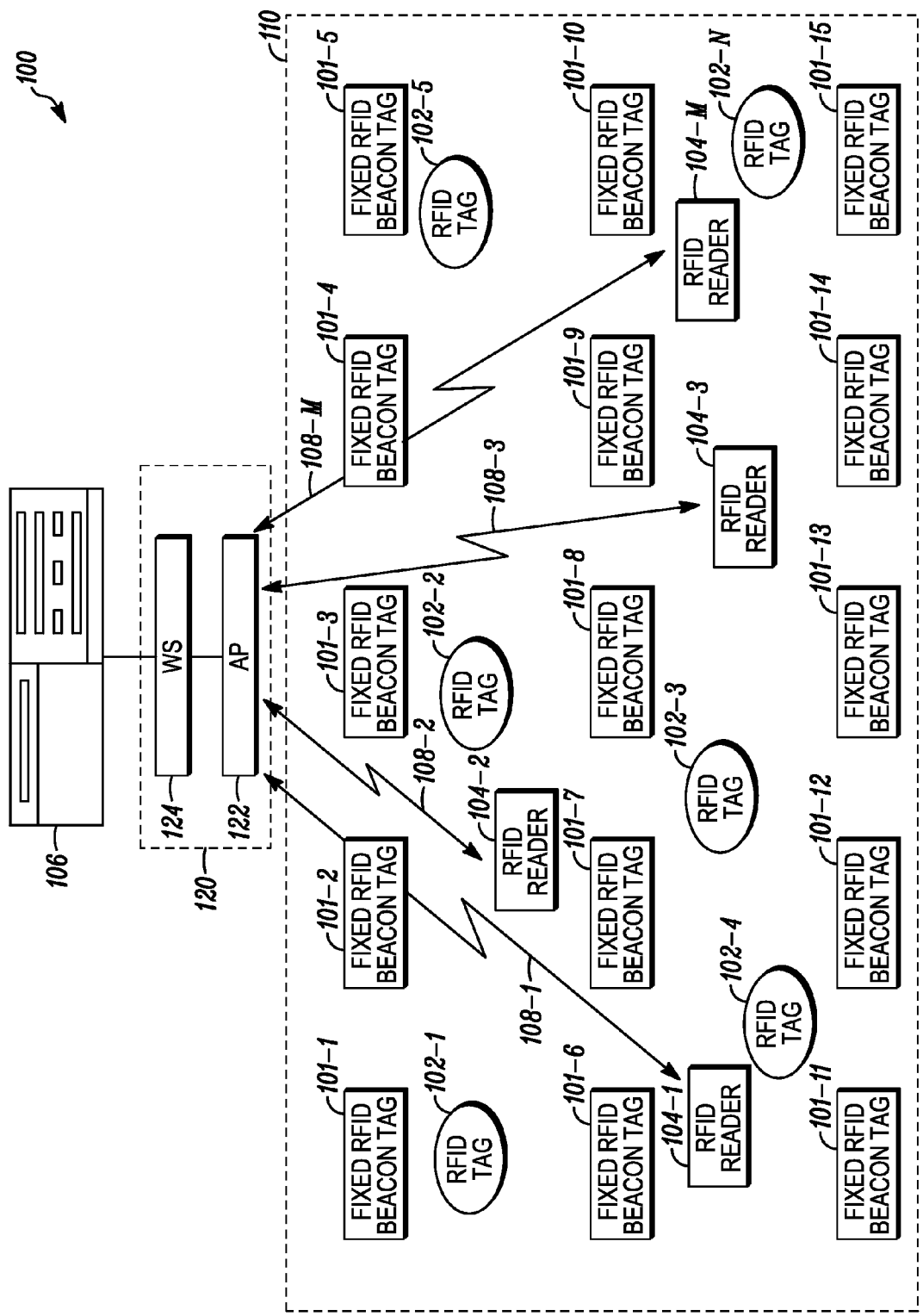

As illustrated in FIG. 1D, RFID item tags 102 can be placed or distributed within the space or environment 110 such that the space or environment 110 includes fixed RFID beacon tags 101, RFID item tags 102 and fixed RFID readers 104. In one embodiment, the system 100 can be employed in a retail store having a large inventory of items that are marked with RFID item tags 102-1 to 102-N that are attached to items present in the retail store. The RFID item tags 102 are not at fixed locations/positions/coordinates and can be moved around to be taken out of the space or environment 110. In other words, the RFID beacon tags 101 are distinguishable from other RFID item tags 102 in that they are fixed at a particular known position (i.e., location or set of coordinates) within the environment 110. The RFID item tags 102 attached to the store-items can include information pertaining to details regarding the respective store-item. For example, item type, price, size, quality, and the like. In one embodiment of the system 100, it is possible to track the store-items by directing the RFID readers 104 to scan the RFID item tags 102. The RFID readers 104 scan and interrogate all the RFID item tags 102 and collect information associated with each of the RFID item tags 102. The RFID readers 104 can provide the collected information to the monitoring server 106.

The system 100 is fully flexible and easily reconfigurable. In some implementations, the RFID item tags 102, the RFID readers 104, and the monitoring server 106 communicate with each other completely wirelessly (i.e., do not utilize wired connections) further enhancing "reconfigurability."

The entities in FIG. 1D will now be described in more detail.

Each of the RFID tags 101, 102 includes an integrated circuit for storing and processing information, modulating and demodulating RF signals, and other functions, and includes an antenna for receiving and transmitting RF signals. Examples of RFID tags include, but are not limited to, active tags, passive tags, semi-active tags, WiFi tags, IEEE 802.11 tags, and the like RFID tags. Note that the term "RFID" is not meant to limit the invention to any particular type of tag. That is, the term "tag" refers, in general, to any RF element that can be communicated with and has an ID (or "ID signal") that can be read by another component. In general, RFID tags may be classified as either an active tag, a passive tag, a semi-active tag or a semi-passive tag. Active tags are devices that incorporate some form of power source (e.g., batteries, capacitors, or the like) and are typically always "on," while passive tags are tags that are exclusively energized via an RF energy source received from a nearby antenna. Semi-active tags are tags with their own power source, but which are in a standby or inactive mode until they receive a signal from an external RFID reader, whereupon they "wake up" and operate for a time just as though they were active tags. A semi-passive tag is a tag with a battery source that is used to extend the range beyond that of a passive tag, but still uses passive backscatter to communicate with the reader. While active tags are more powerful, and exhibit a greater range than passive tags, they also have a shorter lifetime and are more expensive. Such tags are well known in the art, and need not be described in detail herein. For example, one implementation of the RFID item tags is disclosed, for example, in United States Patent Application Number 20100033306, entitled "Method of Configuring RFID Reader" filed Aug. 5, 2008 and assigned to the assignee of the present invention, its contents being incorporated by reference in its entirety herein.

Wireless access ports (alternatively referred to as "APs") are configured to wirelessly communicate with RFID readers 104. Access ports 122 typically communicate with the switching device 124 via appropriate wired communication lines (e.g., conventional Ethernet lines, or the like). A particular AP may communicate with multiple RFID readers 104 (e.g., when multiple RFID readers 104 are located within environment 110). One or more APs may be coupled to a single switching device 124 that can be located internal to or external to environment 110.

The switching device 124 (alternatively referred to as an "RF switch," "wireless switch," or simply "switch") may be coupled to a network (e.g., a WiFi network coupled to one or more other networks or devices) and communicate with one or more software applications (not shown). The switching device 124 includes hardware, software, and/or firmware capable of carrying out a variety of functions and may comprise one or more processors accompanied by storage units, displays, input/output devices, an operating system, database management software, networking software, and the like. In one embodiment, the switching device 124 is modeled on a network switch architecture but includes RF network controller software (or "module") whose capabilities include, among other things, the ability to allow it to configure and monitor RFID readers 104 and their antenna(s). The switching device 124 determines the destination of the packets it receives and routes those packets to the appropriate AP. Such systems are well-known in the art, and need not be described in detail. Switching device 124 may be configured as a general purpose computer, a network switch, or any other such network host. Thus, each AP acts primarily as a conduit, sending/receiving RF transmissions via one or more switching device 124, and sending/receiving packets via a network protocol with switching device. In addition, although not illustrated, the system 100 can also include any number of additional and/or intervening switches, routers, servers and other network components.

In accordance with some of the disclosed embodiments, techniques are provided for locating of RFID item tags 102. The identification and location information for each RFID beacon tag 101 and the RFID readers 104 can be stored at the RFID readers 104 and at the monitoring server 106 and used to build a map of the environment 110 that defines map locations of RFID beacon tags 101 and the RFID readers 104. The information for each RFID beacon tag 101 can also be stored at the RFID reader 104 and/or at the monitoring server 106 so that it can be used to assist in locating items that have RFID item tags 102 attached thereto. During operation, each beacon tag 101 that is within range (e.g., about 0 meters to about 10 meters) of a particular RFID reader 104 can be read by that RFID reader 104. As will be described below, the range varies depending on the implementation and factors such as the particular RFID reader and the particular RFID tag technology being implemented. The data transmitted from each RFID beacon tag 101 is read by RFID reader 104 and can eventually be transmitted to the monitoring server 106 via an AP 122 and/or wireless switch 124. In other implementations, when the infrastructure devices 122, 124 are not employed, the RFID readers 104 can be connected to the monitoring server 106 via wired connections and communicate information directly to the monitoring server 106. The data transmitted from RFID beacon tags 101 can then be processed and used to determine the approximate location of other RFID item tags 102 that are also located in the vicinity.

In general, these techniques involve processing response signals received from RFID item tags 102, and then determining the location of the RFID item tags 102 with respect to known map locations of the fixed RFID beacon tags 101 and the fixed readers 104. The identification data for each RFID tag 102 can be stored at the RFID readers 104 and at the monitoring server 106 prior to beginning the locationing process. This information can be used to reconcile the location of RFID item tags 102 on the map of the environment 110, and may also be used at other readers to produce a graphical representation identifying the position of an RFID tag 102 within environment 110.

The monitoring server 106 compares the information with a record of the store-items maintained by the monitoring server 106. By comparison, the monitoring server 106 can determine whether all the store-items are present in the store and whether the store-items are placed in their correct locations.

The fixed RFID beacon tags 101 can also be used to provide information on coverage of the RFID readers 104. For instance, when a particular RFID reader transmits an interrogation signal and receives response signals from a particular group of RFID beacon tags, the RFID reader knows its general coverage area based on the known positions of the responding RFID beacon tags. For example, if at least one RFID reader cannot scan a RFID beacon tag, then more RFID readers can be placed in that location to provide adequate coverage.

Exemplary RFID Reader

Figure 2:
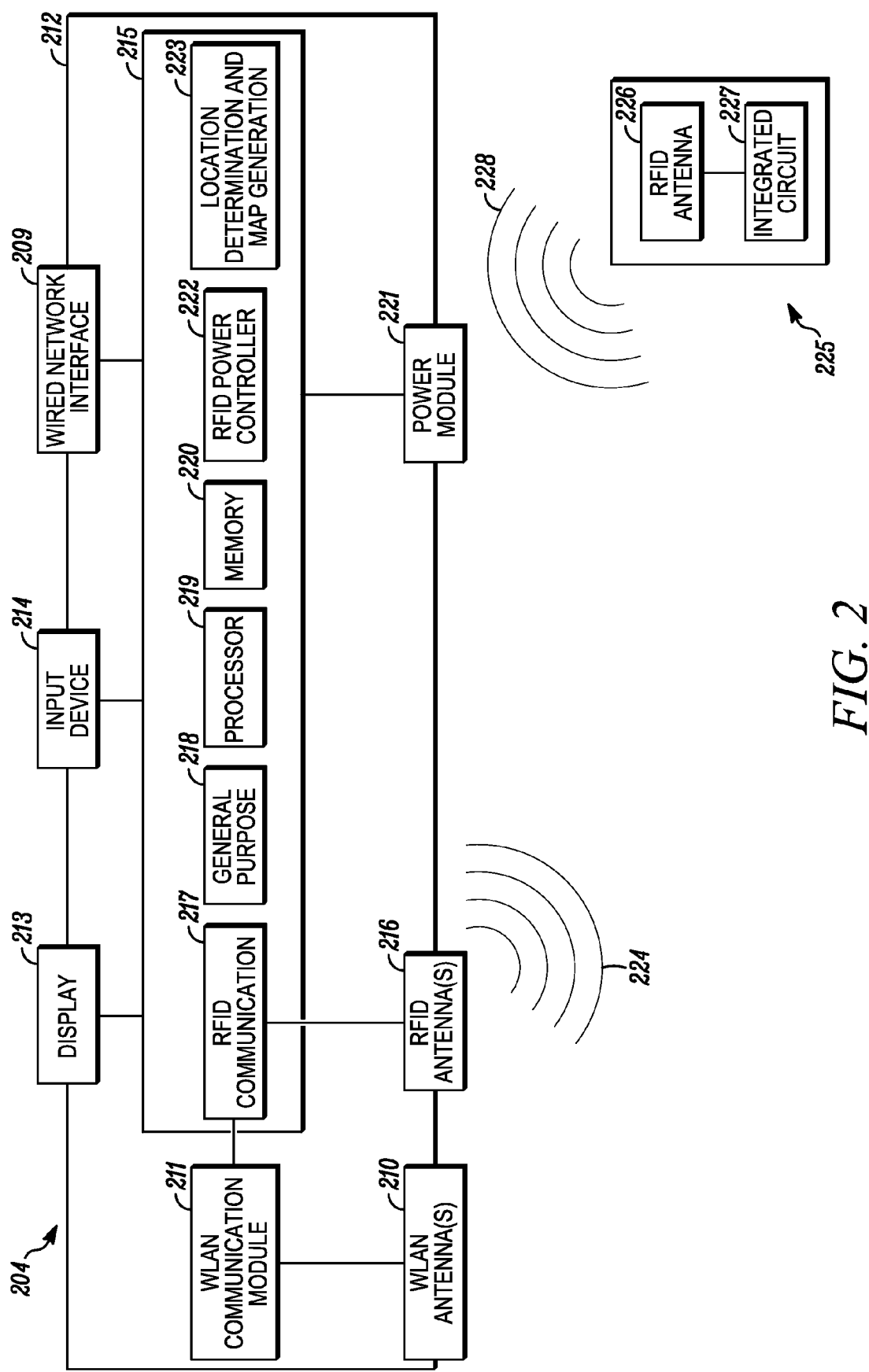
FIG. 2 illustrates a block diagram of an RFID reader and a nearby RFID tag that can be used in accordance with some embodiments of the present disclosure.

FIG. 2 illustrates a block diagram of an RFID reader 204 and nearby RFID tag 225 that can be used in accordance with some embodiments of the present disclosure. The RFID reader 204 can be implemented with an-off-the-shelf RFID reader 204, or other computer or computing device that runs one or more suitably configured software applications. In the following description of FIG. 2, the RFID reader 204 is configured to communicate with an exemplary RFID tag 225.

The functionality of the RFID reader 204 is explained with respect to various modules depicted in the block diagram. It is to be understood that the various modules are shown to facilitate better understanding of the RFID reader 204, and that the modules included in the RFID reader 204 are not meant to be a limitation on embodiments of the present disclosure. Depending on the implementation, the RFID reader 204 may be a fixed device or a handheld portable device. For instance, in embodiments described above with respect to FIG. 1D above, the RFID readers 104 are fixed, whereas in other embodiments (e.g., FIG. 7) the RFID reader is nomadic and can move about the space or environment 110. The following description of the RFID reader 204 has been explained with reference to components shown in FIG. 2. The RFID reader 204 is depicted in a simplified manner, and a practical embodiment can include many additional features and components.

Modules included in one implementation of the RFID reader 204 can generally include a wired network interface 209 (e.g., Ethernet interface), a WLAN communication unit or module 211 that can include one or more WLAN antennas 210, a housing 212, a display element 213 that is visible from the outside of the housing 212, input devices 214 that are accessible from the outside of the housing 212, an RFID electronics module 215 contained within the housing 212, an RFID antenna 216 (which can be, but is not necessarily, contained within the housing 212) and a power module 221 (e.g., a AC power source or a DC power source such as a rechargeable battery). The WLAN communication unit or module 211 and WLAN antennas 210 do not need to be included in all implementations (e.g., where the reader 204 is directly linked to the monitoring server 106 via a wired Ethernet connection over network interface 209). The WLAN communication unit or module 211 and WLAN antennas 210 can be, but are not necessarily contained within the housing 212. The input devices 214 can include a keypad, a touch panel, a keyboard attached to a PC communicating with the RFID reader 204 or other input/output elements such as imaging devices (e.g. cameras including a digital camera, a video camera, etc.) that can be used to take a real time image (e.g., video image or picture) of an area covered by the imaging device of the RFID reader.

The display 213 and input device 214 function as input/output elements for the operator of the RFID reader 204. As will be described below, various software and hardware produce an image or graphical user interface (GUI) on the display 213 indicative of the position of the RIFD reader or readers, the RFID beacon tags 101, and RFID item tags 102 with respect to the RFID reader 104 or readers within environment 110. In various embodiments that will be described below, a coverage map (hereinafter also referred to as a map) can be displayed as a GUI on the display 213 (e.g., screen) of a RFID reader. The coverage map that is displayed on the display 213 of the RFID reader can display the entire space or environment 110 or any portion of the entire space or environment 110. In each of the embodiments described below, the coverage map can indicate read range information for one or more of the RFID readers that appear on the coverage map.

The display 213 and input device 214 can be coupled to the RFID electronics module 215 as necessary to support input/output functions in a conventional manner.

The RFID electronics module 215 represents the hardware components, logical components, and software functionality of the RFID reader 204. In practical embodiments, the RFID electronics module 215 can be physically realized as an integrated component, board, card, or package mounted within the housing 212. As depicted in FIG. 2, the electronics module 215 can be coupled to one or more RFID antennas 216, for example, via RF cables and RF connector assemblies. In one embodiment, multiple RFID antennas 216 are included. These RFID antennas 216 can include dual-polarized RFID antenna and circularly polarized RFID antenna. The RFID reader 204 can switch between the antennas to create different radiation patterns.

The RFID electronics module 215 may generally include a number of sub-modules, features, and components configured to support the functions described herein. For example, the electronics module 215 may include an RFID reader communication sub-module 217, a general purpose sub-module 218, at least one processor 219, memory 220, an RFID power controller sub-module 222 and a location determination and map generation sub-module 223. In a practical embodiment, the various sub-modules and functions need not be distinct physical or distinct functional elements. In other words, these (and other) functional modules of the RFID reader 204 may be realized as combined processing logic, a single application program, or the like.

The RFID electronics sub-module 215 also includes an RFID communication sub-module 217 designed to support RFID functions of the RFID reader 204 and to communicate with the RFID tags via RFID antenna(s) 216. The RFID communication module 217 can include an RFID reader transceiver that includes a transmitter and a receiver with conventional circuitry to enable digital or analog transmissions over a wireless communication channel. The transceiver enables the RFID reader 204 to communicate with the RFID beacon tags 101, 102 via antenna(s) 216.

For example, the RFID reader transceiver generates RFID interrogation signals and receives reflected RFID response signals generated by RFID tags in response to the interrogation signals. In the example embodiment described herein, the RFID communication sub-module 217 is designed to operate in the UHF frequency band designated for RFID systems. Alternate embodiments may instead utilize the High Frequency band or the Low Frequency band designated for RFID systems. The operation of RFID readers and RFID transceivers are generally known and, therefore, will not be described in detail herein. Notably, in this example embodiment, the RFID communication sub-module 217 is operable at various transmit power levels, as controlled by the RFID power controller 222 sub-module. The RFID power controller sub-module 222 can adjust the power of transmission of interrogation signals transmitted by the RFID antenna(s) 216. The transmit power level or radio signal strength of the interrogation signals can be adjusted so that the interrogation signals can travel varying distances from the RFID reader 204. For example, the operator of an RFID reader can adjust the transmit power level or radio signal strength to cover the area of interest, thus avoiding the interrogation or polling of items placed on other shelves or racks, which are of no interest in the current polling. In one non-limiting, exemplary embodiment, the RFID reader 204 provides a linear coverage for 10 feet of the space at a particular transmit power level, which translates into a circular coverage for 5 feet of the space at the particular transmit power level. The RFID power controller sub-module 222 can be embodied separately, or integrated with one or more other sub-modules, such as the general purpose sub-module 218 that is described below.

The WLAN communication module 211 also includes a transceiver (not illustrated) designed to communicate information over a wireless communication RF link with access point or port 122 via WLAN antenna(s) 210. For example, the transceiver may include a wireless data communication element that supports bi-directional wireless data transfer using suitable wireless data transmission protocols and methodologies. In such a deployment, the RFID antenna 216 may be tuned to avoid RF interference with the wireless data communication elements. The transceiver can be designed to operate over an air interface such as those defined in IEEE 802 standards, such as 802.11 WLAN (Wireless Local Area Network)/Wi-Fi (Wireless Fidelity), 802.16 WiMax (Worldwide Interoperability for Microwave Access), and the like.

The general purpose sub-module 218 can be responsible for handling non-RFID functions of the RFID reader 204, as needed. The general purpose sub-module 218 can be configured to support data communication over physical connections. The general purpose sub-module 218 may also be configured to support data capture functions of RFID reader 204, where such data capture functions include one or more of: bar code reading; imaging; magnetic stripe reading; GPS data receiving; and IrDA. These data capture modes can be utilized to support traditional uses of the RFID reader 204, e.g., inventory control, tracking of packages, retail checkout, rental car returns, and other applications. The general purpose sub-module 218 can also manage the communication of the RFID reader 204 with the RFID tags 101, 102, 225 and the monitoring server 106. Although not separately depicted in FIG. 1D, the general purpose sub-module 218 can also include a data capture sub-module (not illustrated) that is configured to support such data capture modes. The data capture sub-module can receive instructions from the monitoring server 106 to obtain information pertaining to the items in the environment 110 that have RFID item tags 102 attached thereto. The data capture sub-module generates commands for scanning the RFID item tags 102 that are present within the coverage range of the RFID reader 204. In other exemplary implementations, the data capture sub-module interrogates each and every tag within the range of the RFID reader 204, and obtains information pertaining to the store-items. After obtaining the information, the data capture sub-module modulates the obtained information and transmits it through the one or more antennas to an access port and/or wireless switch via an antenna 210, and the information is eventually provided to the monitoring server 106.

The processor 219 can be any general purpose microprocessor, controller, or microcontroller that is suitably configured to control the operation of the RFID reader 204. In practice, the processor 219 executes one or more software applications that provide the desired functionality for the RFID reader 204, including the operating features described in more detail below. The memory 220 may be realized as any processor-readable medium, including an electronic circuit, a semiconductor memory device, a ROM, a flash memory, an erasable ROM, a floppy diskette, a CD-ROM, an optical disk, a hard disk, an organic memory element, or the like. As an example, the memory 220 is capable of storing RFID data captured by the RFID reader 204.

The power module 221 provides operating power to the RFID reader 204. In one embodiment, the power module 221 includes a battery that supplies power to the RFID reader 204. In some implementations, the battery is rechargeable via ambient lighting so that each RFID reader can be trickle charged. Power status of the RFID readers is communicated back to the central monitoring server 106 via the wireless link or a wired communication link, and low power conditions can set off alert signals for servicing. The power module 221 can also indirectly supply operating power to the RFID tags 225, if the RFID tags 225 are passive tags. Passive tags do not have a battery of their own, and therefore derive power from RF signals transmitted by the RFID readers. When a passive tag encounters radio waves from a reader, a coiled antenna within the RFID tag forms a field. The RFID tag draws power from it, energizing the circuits in the RFID tag.

The location determination and map generation sub-module 223 can perform boundary determination operations for the RFID reader 204 to define read ranges or coverage areas or zones for the RFID reader, and can generate maps of the space or environment 110 or a portion thereof. Boundary determination can be used to evaluate the spatial relationship between the RFID reader 204 and various surrounding RFID tags. In some embodiments, the location determination and map generation sub-module 223 can cooperate with or be embodied as a component of the general purpose sub-module 218. The boundaries are neither exact nor static. Depending on the environment, and depending on the movement of people, radio waves travel differently, covering different areas.

A RFID reader, such as the one described above, preferably is capable of functioning in one or more alternate modes, including the RFID reader mode. The primary functions of the RFID reader need not be limited to data capture and RFID tag interrogation. Rather, the RFID reader can be capable of multi-tasking and multi-functioning. Some functions, such as a bar-code scanner and alternate manual input interfaces, can also be present. In some embodiments, the RFID reader 204 can be a single device, while in others, multiple devices can combine various features to accomplish the functions listed above, and others desired for or necessary to the embodiment. A RFID reader, such as the one described above, is preferably used as in conjunction with the systems and methods described below.

The exemplary RFID tag 225 illustrated in FIG. 2 comprises a RFID antenna 226 and an integrated circuit 227. The RFID antenna 226 can receive RF signals such as an interrogation signal 224 and transmit RF signals receive, such as response signals 228. The integrated circuit 227 represents one or more modules cooperating to store and process information including demodulating RF interrogation signals and for modulating RF response signals.

Each antenna 216 within RFID reader 204 has an associated RF read range (or "coverage area"), which depends upon, among other things, the gain of the respective antenna or strength of the transmit signal of the respective antenna. The read range corresponds to the coverage area around the antenna 216 in which a tag 225 may be read by that antenna, and may be defined by a variety of shapes, depending upon the nature of the antenna.

The exemplary RFID tag 225 can be positioned within transmission range or read range of the RFID reader 204. When the RFID tag 225 receives the interrogation signal 224 with its RFID antenna 226, the integrated circuit 227 can perform one or more operations in response, including demodulating the interrogation signal 224 (to know when and with what to respond) and modulating the interrogation signal 224 using "backscatter modulation" (e.g., modulating the reflection coefficient of its antenna with the information to respond with), and transmitting the modulated interrogation signal 224 from the RFID antenna 226 as a response signal 228.

The RFID reader 204 can receive the response signal 228, and extract useful information from it including, but is not limited to, the identity of the RFID tag 225 (i.e., a tag identifier). Moreover, in some implementations, if the RFID tag 225 is a RFID beacon tag, the RFID reader 204 can determine other information such as the position of the RFID beacon tag.

As will be described below, the use of such RFID beacon tags allows the RFID readers 104 to generally determine their respective locations (with respect to a coverage area defined by the RFID beacon tags that they receive response signals from) and to create a map of the environment 110 that can be displayed on the reader (or at the monitoring server 106) that in turn makes it easier for a user to determine the specific locations of particular items.

Exemplary Monitoring Server

Figure 3:
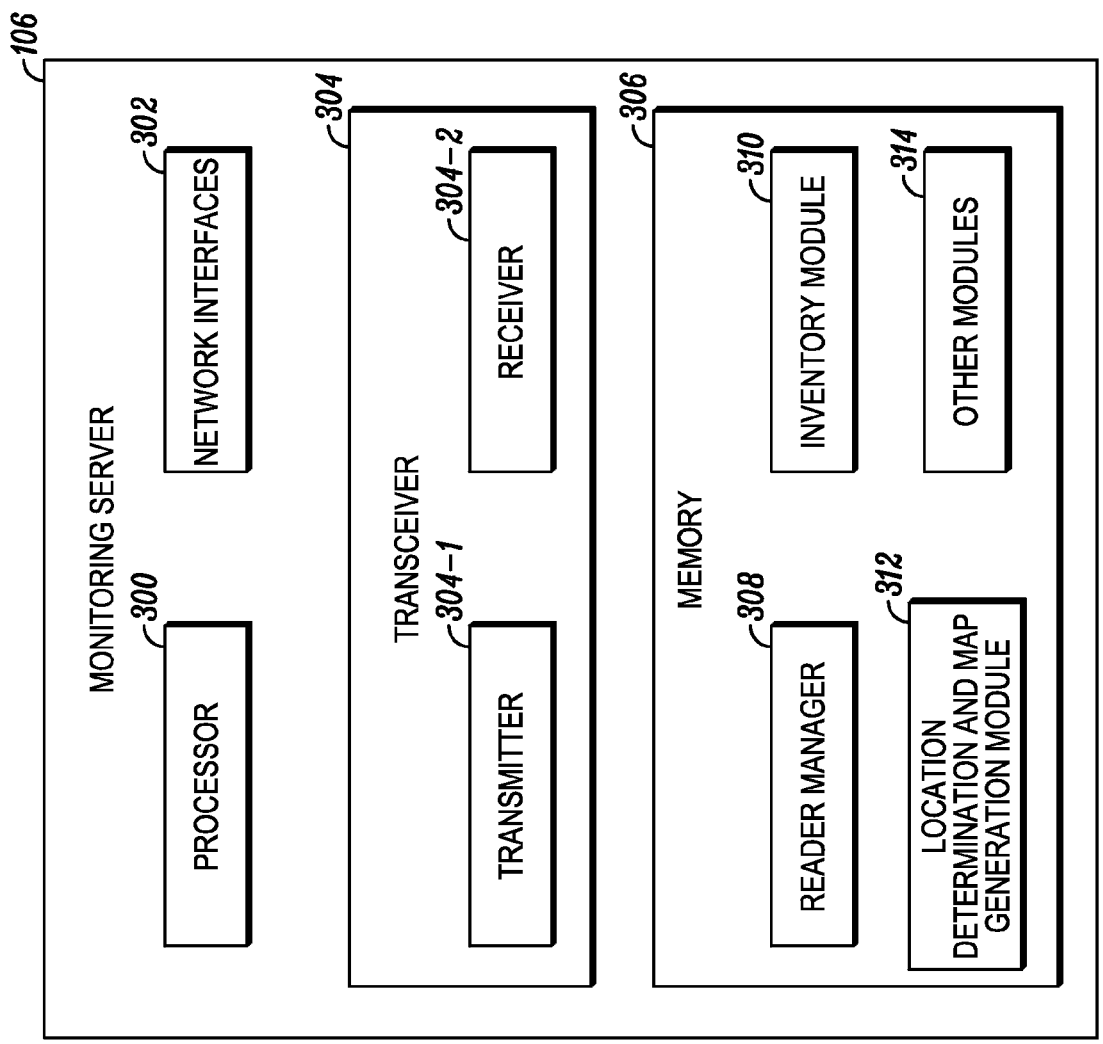
FIG. 3 illustrates a block diagram for a monitoring server included in the system of FIG. 1D in accordance with some embodiments of the present disclosure.

FIG. 3 illustrates a block diagram for a monitoring server 106 included in the system of FIG. 1 in accordance with some embodiments of the present disclosure.

The functionality of the monitoring server 106 is explained with respect to various modules depicted in the block diagram. It is to be understood that the various modules are shown to facilitate better understanding of the monitoring server 106. However, the modules included in the monitoring server 106 are not meant to be a limitation on an embodiment of the present disclosure.

In one embodiment, the monitoring server 106 includes a processor 300, one or more network interfaces 302 for establishing connection with infrastructure devices 122, 124 present in the system 100, a transceiver 304, and a memory 306 for storing operating instructions that can be executed by the processor 300. The monitoring server 106, for example, can be an integrated unit containing at least all the elements depicted in FIG. 3, as well as any other elements necessary for the monitoring server 106 to perform its particular functions.

The processor 300 includes one or more microprocessors, microcontrollers, DSPs (Digital Signal Processors), state machines, logic circuitry, or any other device or devices that process information based on operational or programming instructions. Such operational or programming instructions are stored in the memory 306. The memory 306 can be an IC (Integrated Circuit) memory chip containing any form of RAM (Random Access Memory) or ROM (Read-Only Memory), a floppy disk, a CD-ROM (Compact Disk Read-Only Memory), a hard disk drive, a DVD (Digital Video Disc), a flash memory card or any other medium for storing digital information. One of ordinary skill in the art will recognize that when the processor 300 has one or more of its functions performed by a state machine or logic circuitry, the memory 306 containing the corresponding operational instructions can be embedded within the state machine or logic circuitry.

The transceiver 304 includes a transmitter 304-1 and a receiver 304-2. The transceiver 304 enables the monitoring server 106 to communicate with the RFID readers 104 and/or with other devices such as infrastructure devices 120. In this regard, the transmitter 304-1 and the receiver 304-2 include conventional circuitry to enable digital or analog transmissions.

The transmitter 304-1 can be designed to allow transmitting to multiple devices on multiple frequency bands. The receiver 304-2 is designed to allow receiving of radio frequency (RF) signals from within at least one bandwidth and optionally more bandwidths, if the communications with the proximate device are in a frequency band other than that of the network communications.

The implementations of the transmitter 304-1 and the receiver 304-2 depend on the implementation of the monitoring server 106. For example, the transmitter 304-1 and the receiver 304-2 can be implemented as an appropriate wireless modem, or as conventional transmitting and receiving components of two-way wireless communication devices. Most, if not all, of the functions of the transceiver 304 can be implemented in a processor, such as the processor 300.

The memory 306 includes various modules 308, 310, 312, 314 containing instructions for functioning of the monitoring server 106. The functioning of the monitoring server 106 is explained using the modules to facilitate better understanding; however, these modules do not limit implementation various embodiments disclosed in the present disclosure.

In one embodiment, the memory 306 includes a reader manager module 308, an inventory module 310, a location determination and map generation module 312 and other modules 314 such as operating system, application support software, and other similar modules that assist in proper functioning of the monitoring server 106.

The RFID reader manager 308 manages the communication with the RFID readers 104, and assists the RFID readers 104 in their functioning. In one embodiment, when an inventory poll is required in the store, the RFID reader manager 308 communicates either directly or indirectly (via the infrastructure devices 120) with the RFID readers 104 and directs them to interrogate the RFID item tags 102. The RFID reader manager 308 also specifies information that is required from the RFID item tags 102. The information can include data related to location of the store-items, type of the store-items, price details of the store-items, and the like. The RFID readers 104 obtain the required information from the RFID item tags 102 and provide it to the monitoring server 106. Apart from directing the RFID readers 104 for polling, the monitoring server 106 also keeps a check on power status of each of the RFID readers 104. In one embodiment, the monitoring server 106 monitors battery power level of the RFID readers 104 on a periodic basis, and sets alerts if any reader has a low battery. In one embodiment, the RFID readers 104 transmit their power status to the monitoring server 106 whenever they have low battery power. The monitoring server 106 can also set alerts if a particular RFID reader becomes faulty, or if a particular RFID reader communicates that one or more tags 102 are not operational. For instance, the monitoring server 106 can raise either a visual alarm or an audio alarm indicating service requirement for affected reader(s).

The inventory module 310 maintains inventory of the store-items currently present in the store, and verifies the information obtained from the RFID readers 104. In one embodiment, the inventory module 310 includes a database having a record of the store-items present in the store. Whenever a store-item is sold or a new item is added in the store, the inventory module 310 receives information pertaining to the sold store-item or the newly added item, and accordingly the inventory module 310 updates its database. Therefore, the inventory module 310 remains updated about the store-items present in a store at any instant. During an inventory poll in the store, the RFID reader manager 308 provides the information obtained from the RFID readers 104 to the inventory module 310. The inventory module 310 compares the information with the record maintained in its database, and thereby verifies the store-items present in the store. The inventory poll can be repeated on a regular basis. In one embodiment, the inventory module 310 provides the result of comparison to the RFID reader manager 308. Based on the result, the RFID reader manager 308 decides whether to repeat inventory polling or not. In addition, the RFID reader manager 308 prepares a report including the result of inventory poll, details of the store-items, location of store-items, and the like. The report may also include battery-status of readers 104. Such a report helps a retailer to identify areas that require attention.

The location determination and map generation module 312 can store the position/location/coordinates of fixed RFID beacon tags and/or the fixed RFID readers. The location determination and map generation module 312 can also determine the relative positions/locations of each of the RFID item tags (and hence the item it is attached to), can determine read ranges or coverage areas of RFID readers (fixed or otherwise), and can also generate maps of a space or environment 110 or a portion thereof. The location determination and map generation module 312 can provide this information to the RFID readers to the extent they do not determine it themselves.

Various embodiments of the present disclosure will now be described with respect to FIGS. 4A-8 including methods for RFID system deployment, methods for RFID coverage map generation, methods for RFID reader coverage verification, methods for relative item location determination within a space, methods for defining multiple different coverage areas or read ranges of then RFID reader, and methods for displaying read range of an RFID reader.

RFID System Deployment Coverage Map Generation and RFID Coverage Verification

Prior to describing some embodiments of the present disclosure in detail, it is to be noted that in the description that follows, some embodiments will be described with respect to FIGS. 4A-6B in which the RFID readers are "fixed" at known locations/positions/coordinates, whereas in other embodiments, described with respect to FIGS. 7-8, in which at least one of the RFID readers are "nomadic" and can move about from one location to another.

Figure 4A:
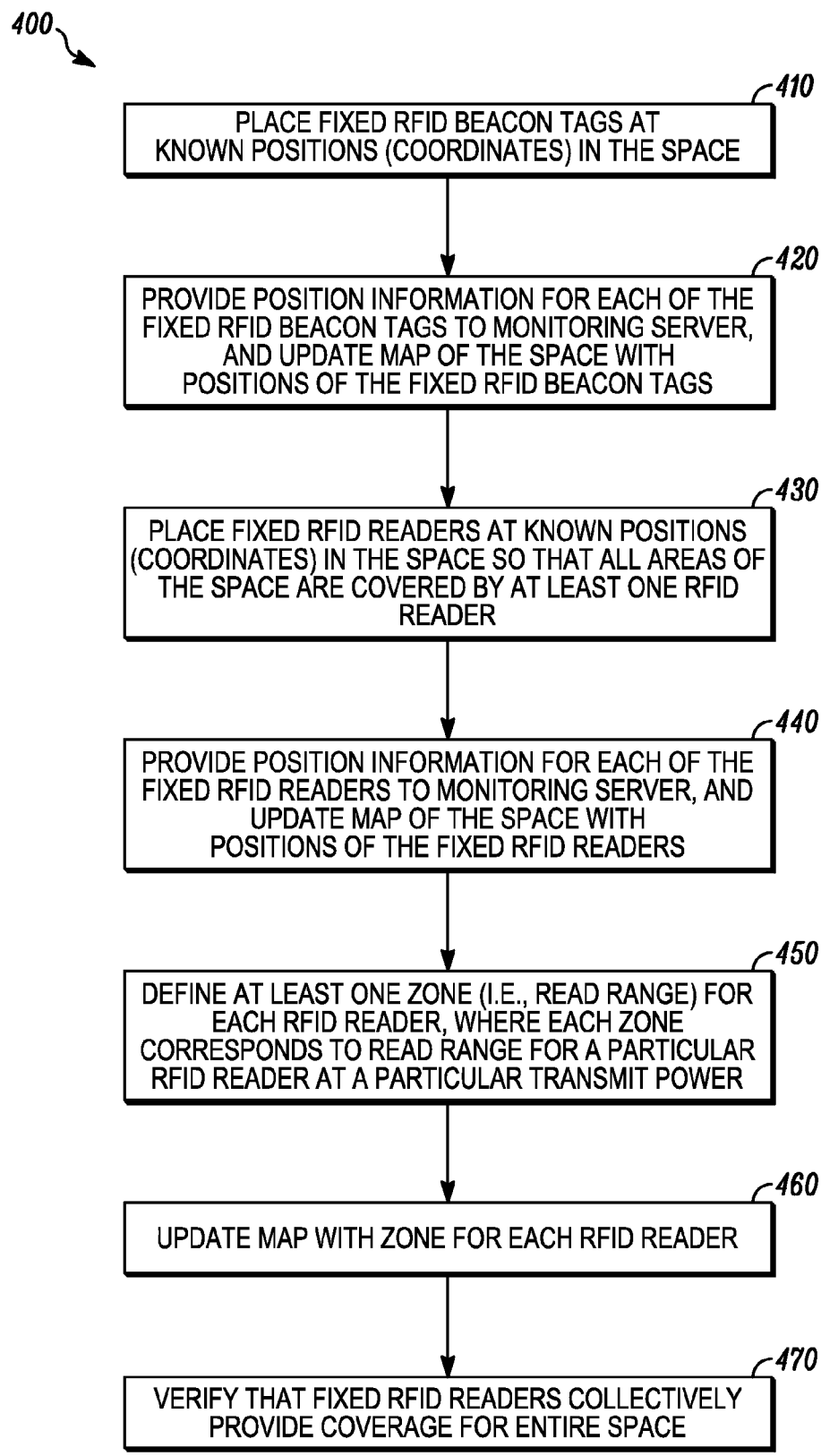
FIG. 4A illustrates a flowchart of a method for generating a coverage map that displays locations of fixed RFID beacon tags, fixed RFID readers and read ranges or coverage areas for the fixed RFID readers based on feedback from the fixed RFID beacon tags in accordance with some embodiments of the present disclosure.

FIG. 4A illustrates a flowchart of a method 400 for generating a coverage map that displays locations of fixed RFID beacon tags, fixed RFID readers and read ranges or coverage areas for the fixed RFID readers based on feedback from the fixed RFID beacon tags in accordance with some embodiments of the present disclosure.

In one implementation, the method 400 can be implemented when installing an RFID system in a space or an environment 110 such as a retail store or a section/portion of a retail store. Once installed, the RFID system can then be used to keep track of inventory items present in the environment 110. The system can generate a map of the space or environment so that fixed RFID readers and RFID beacon tags can be displayed to a user on the RFID reader, along with relative estimated locations (RELs) where particular items are located with respect to particular coverage areas that are associated with the RFID readers.

In the example that follows, some particular steps of the method 400 of FIG. 4A will be explained with reference to FIGS. 4B-4F, which illustrate one exemplary, non-limiting implementation of a portion or part of a coverage map 413 in which a "read range" or "coverage area" of a particular RFID reader 404 is illustrated as a coverage area 450. Although it is not illustrated in FIGS. 4B-4F, the method 400 can be used to establish a read range or coverage area for each of a plurality of fixed RFID readers that are distributed in a space or environment.

In addition, although the steps 410-460 of method 400 are illustrated in a particular order, it is to be appreciated that the actual order of certain steps can be changed or that optional steps can even be completely eliminated. For example, in one implementation described below, RFID beacon tags are distributed, their positions determined, RFID readers are distributed, their positions are determined, etc., however, in alternative implementations, RFID readers can be distributed first, then RFID beacon tags, and then positions of all can be determined. In yet another implementation, the fixed RFID beacon tags are first distributed. Then the readers are placed without entering their precise locations in the system. Rather, the system is self-locating: as the RFID readers interrogate RFID tags within their coverage area or read range, RFID beacon tags within that range will respond, and the system can then determine the approximate coverage range of each RFID reader by knowing which RFID reader interrogates which RFID beacon tags. Therefore any item interrogated by that RFID reader is assumed to be within the coverage range defined by those RFID beacon tags.

It is to be noted that prior to method 400, measurements of a space or environment 110 can be made and entered into map generation module (MGM) to generate a map of the space or environment 110 that includes a coordinate system and boundaries of the space or environment 110. Examples of such MGM include Generic Map Tools (GMT), Google Maps, Online Map Creation (OMC), and any other map generation software. The coordinate information that specifies the boundaries of the space or environment 110 can be determined by manually, and then input into the MGM to generate the map of the space or environment 110. In one implementation, the MGM can be implemented at the RIFD readers, whereas in other implementations the MGM can be implemented at the monitoring server 106.

The method 400 begins at step 410, where a plurality of RFID beacon tags 101 are distributed at fixed locations or positions or coordinates in a space or environment 100. For example, when implemented in a retail space, RFID beacon tags can be placed on shelves, floor, walls, and at other locations throughout the space. The location/position/coordinates of each of the RFID beacon tags 101 can be determined and the RFID beacon tags 101 can be programmed with information that specifies their respective location/position/coordinates.

Figure 4B:
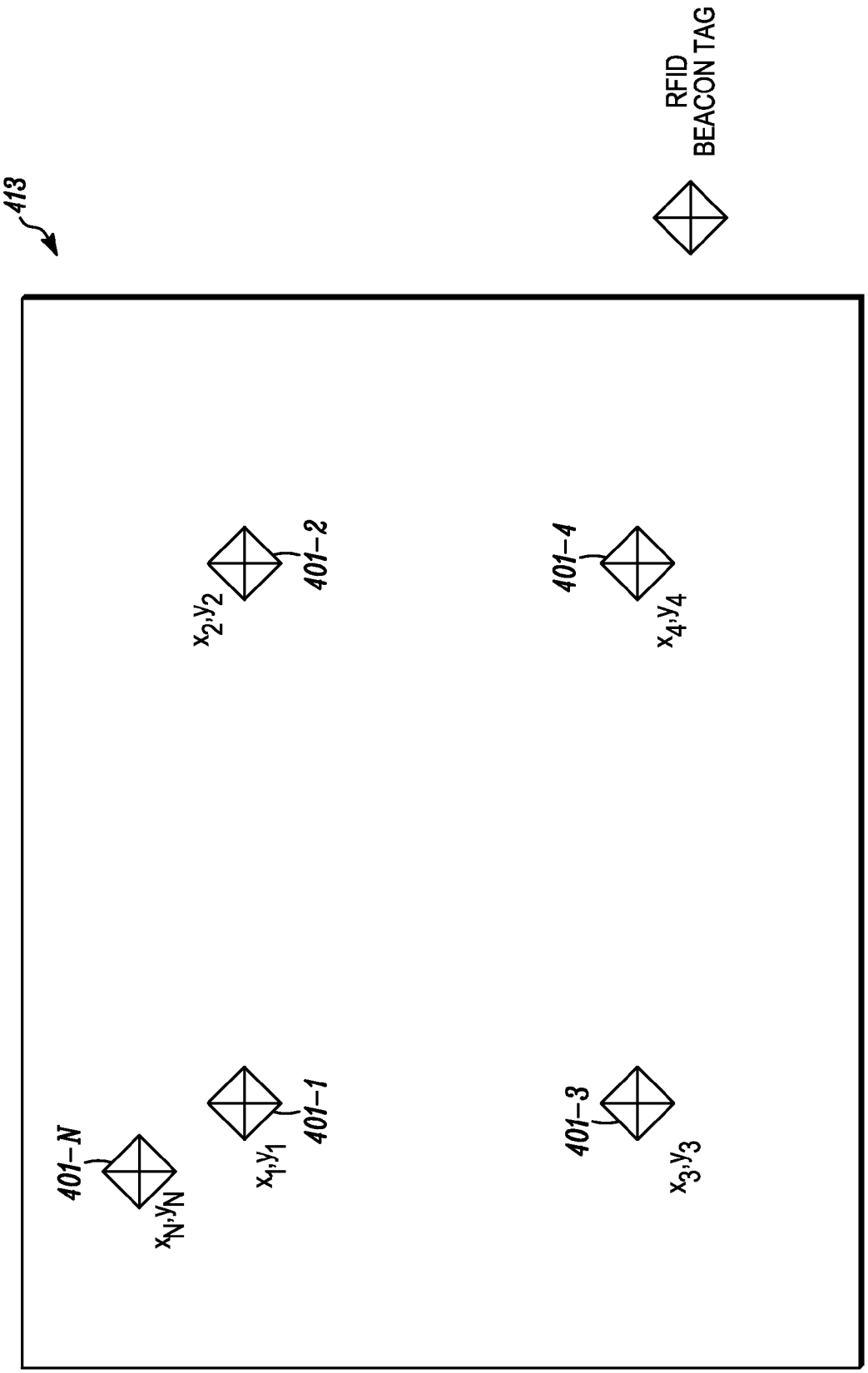
FIG. 4B illustrates a portion of a space or environment in which five RFID beacon tags have been placed.

FIG. 4B illustrates a portion 413 of a space or environment in which five RFID beacon tags 401 have been placed. In particular, FIG. 4B illustrates one example layout where RFID beacon tags 401-1, 401-2, 401-3, 401-4, 401-N are distributed at coordinates $x_1, y_1; x_2, y_2; x_3, y_3; x_4, y_4; x_N, y_N$, respectively, in a portion 413 of a space or environment. In this simplified example, the positions of the RFID beacon tags 401-1, 401-2, 401-3, 401-4, 401-N are represented using a two-dimensional Cartesian coordinate system, but it is to be appreciated that any coordinate system can be implemented including a three-dimensional Cartesian coordinate system, a polar coordinate system, The position information or relative positions of the RFID beacon tags 401-1, 401-2, 401-3, 401-4, 401-N within the space or environment 110 can be determined using any of the techniques described above. The location of the RFID beacon tags can also be entered relative to the various landmarks within the space, such as walls, pillars, doors, etc.

At step 420, the position information for the RFID beacon tags is input into the map generation module (MGM), and the MGM creates/updates the map of the space or environment 110 with the locations of each of the RFID beacon tag. As will be described below, the RFID beacon tags 101 can provide fixed reference points for RFID readers 104. Among other information, the RFID beacon tags 101 can provide location beacons to the RFID readers 104, thereby indicating the current location/position of the respective beacon tags 101 with respect to RFID readers 104.

At optional step 430, a plurality of fixed RFID readers 104 are placed, provided, deployed or distributed at fixed locations or positions or coordinates within the space or environment 100. In other words, each of the fixed RFID readers 104 is fixed at a particular known location within the space or environment 110. This step is optional since method 400 could also be used to determine read range for RFID readers that are nomadic (i.e., have the ability to move about with the space or environment, and are therefore not fixed), as will be described below with reference to FIGS. 7 and 8. Furthermore, even fixed readers may be moved from one fixed location to another, as the RFID readers may be attached to shelves and tables that can sometimes be moved around. When step 430 is performed, the RFID readers 104 are distributed at fixed locations or positions in the space or environment 110 so that once their location is established, the monitoring server 106 can rely on that location as being a fixed reference point. As will be explained below with respect to step 470 and FIG. 4G, the RFID readers 104 are ideally distributed throughout the space or environment 110 such that the coverage areas of the RFID readers 104 cover the entire space or environment 110 so that the RFID readers 104 can interrogate RFID tags present anywhere within the space or environment 110. With proper deployment of fixed RFID readers 104 throughout the space or environment 110, the entire space or environment 110 can be covered by different RFID readers 104 to provide full coverage throughout the space or environment 110 using coverage verification methods described below with respect to FIG. 4G. This way, each of the RFID tags in the space or environment 110 is within interrogation range of at least one reader to ensure that all tags 101, 102 within the space or environment 110 can be scanned or "interrogated" by at least one of the RFID readers 104. In one implementation, to enable easy deployment of such RFID systems, each of the fixed RFID readers 104 are battery-powered by a battery. The batteries can be either replaceable, rechargeable from the outlet, or rechargeable from ambient lighting. Moreover, the RFID readers 104 may communicate via RFID interrogation signals and WLAN communication signals thereby eliminating the need for any wired connections.

Figure 4C:
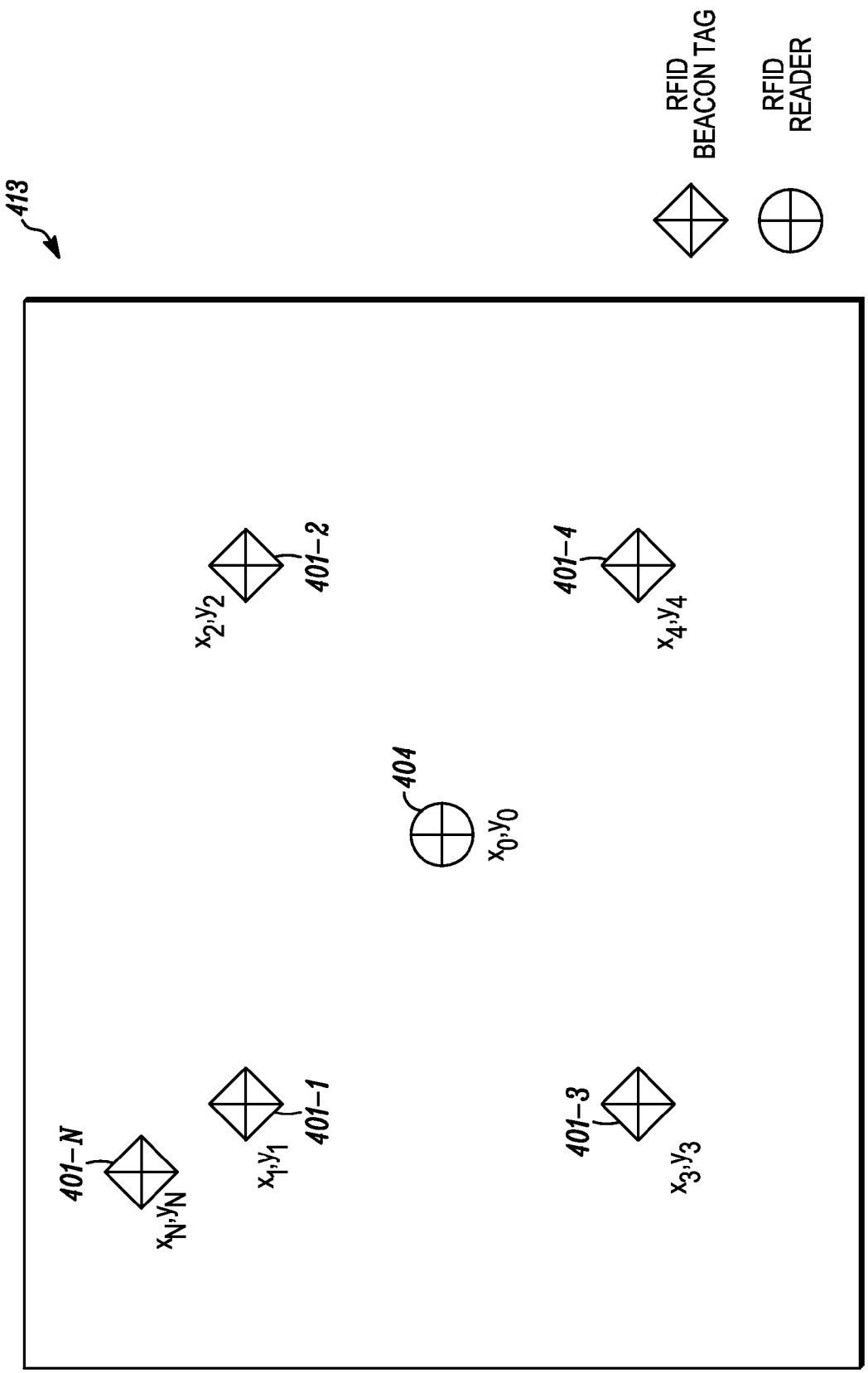
FIG. 4C illustrates the portion of the space or environment that includes locations of RFID beacon tags and the particular RFID reader.

FIG. 4C illustrates a portion of a space or environment 413 includes locations of RFID beacon tags 401 and the particular RFID reader 404. In particular, FIG. 4C illustrates one example layout where a single RFID reader 404 is positioned at coordinates $x_0, y_0$ in a portion 413 of the space or environment, but as shown in FIG. 1C it will be appreciated that multiple RFID readers 104 can be distributed throughout the space or environment 110. Again, the positions of the RFID reader 404 are represented using a two-dimensional Cartesian coordinate system, but can be represented using any coordinate system including those described above. The position information or relative position of the RFID readers can be determined using any of the techniques described above. It should be noted, that the position of the RFID reader does not necessarily need to be determined with any accuracy. What is of interest to the system is to determine the coverage of the RFID readers. Once the RFID reader coverage is known, it is then clear that tags responding to the interrogation of a particular RFID reader are located within that reader's coverage range.

Step 440 is also optional since it is only performed in implementations where step 430 is performed (i.e., when the RFID readers 404 are distributed at fixed locations). At optional step 440, the position information for the RFID reader 404 is input into the map generation module (MGM), and the MGM updates the map of the space or environment 110 with the locations of each of the RFID readers including the RFID reader 404. In one implementation, the MGM can be included at the monitoring server 106, and can automatically compute which particular fixed RFID beacon tags 101 are within range of a particular reader 104 and can create a map that includes each of the RFID readers 104 and locations of each of the fixed RFID beacon tags 101 with respect to those readers.

At step 450 at least one coverage area/zone or "read range" is defined for each RFID reader. Each coverage area corresponds to a read range for a particular RFID reader at a particular transmit power of an interrogation signal generated by that particular RFID reader. When a RFID reader includes multiple different antennas on the same RFID reader, each of the antennas can be focused on different areas and will have different coverage areas. Each coverage area encompasses a coverage area of a particular RFID reader 104 and particular fixed RFID beacon tags 101 that are within range of that particular RFID reader 104. As explained above, the RFID readers 104 have a limited maximum read range and they can interrogate only those tags that are in their maximum read range/coverage area. In one embodiment, because the monitoring server 106 knows the coverage area of the RFID readers by knowing which of the fixed RFID beacon tags 101, it can read. In one implementation, each particular RFID reader 104 can be considered a point of origin for its corresponding zone(s). In one implementation, the monitoring server 106 can request that the RFID readers 104 interrogate the fixed RFID beacon tags 101 and provide response signal information to the monitoring server 106. One method for defining the read range(s) or zone(s) for a particular RFID reader will be described below with reference to FIG. 4D-4F.

At step 460, coordinate information that defines at least one read range or coverage area for each RFID reader 104 is input into the map generation module (MGM), and the MGM updates the map of the space or environment 110 with the coverage range of each of the RFID readers, and their respective coverage area that define their read range. Alternatively, the MGM can also include the actual physical location of the RFID readers.

In addition, in accordance with another embodiment of the present disclosure, at step 470, RFID reader coverage of the entire space or environment 110 can be verified. As described above, the fixed RFID readers 104 can receive response signals from the fixed RFID beacon tags within their respective coverage areas, and the fixed RFID readers 104 can extract identification information from these response signals received from the fixed RFID beacon tags within their respective coverage areas, and then transmit the identification information for the fixed RFID beacon tags that are within their coverage areas to a monitoring server 106. The monitoring server 106 can then verify coverage by checking to ensure that a response signal was received from each of the fixed RFID beacon tags 101. One method for verifying coverage will be described below with respect to FIG. 4G. Step 470 can be performed at any step after step 430, but is illustrated after step 460 for purposes of convenience.

Figure 4D:
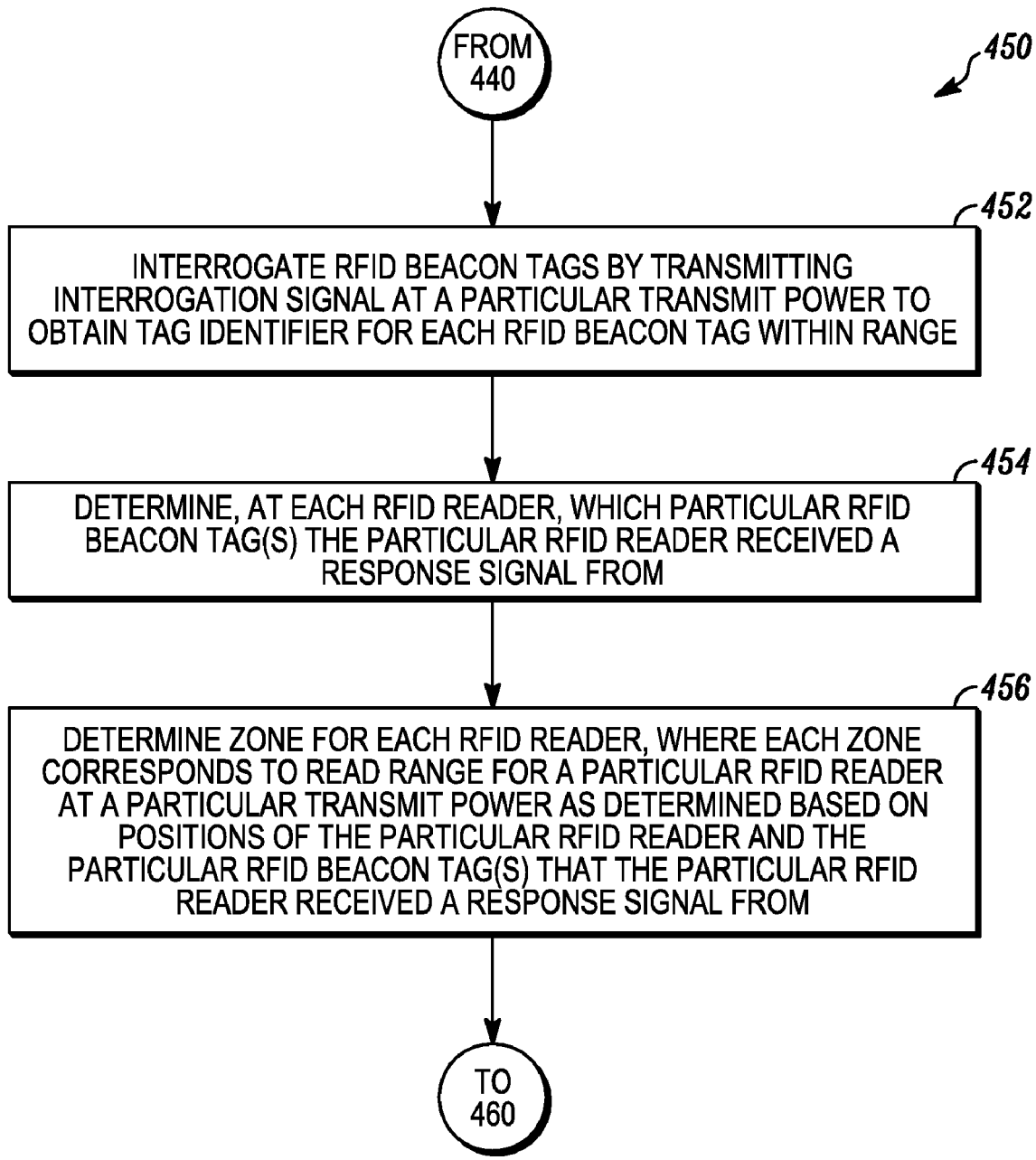
FIG. 4D illustrates a flowchart of a method for defining read range for RFID readers based on feedback from RFID beacon tags present within a particular space or environment in accordance with some embodiments of the present disclosure.
Figure 4E:
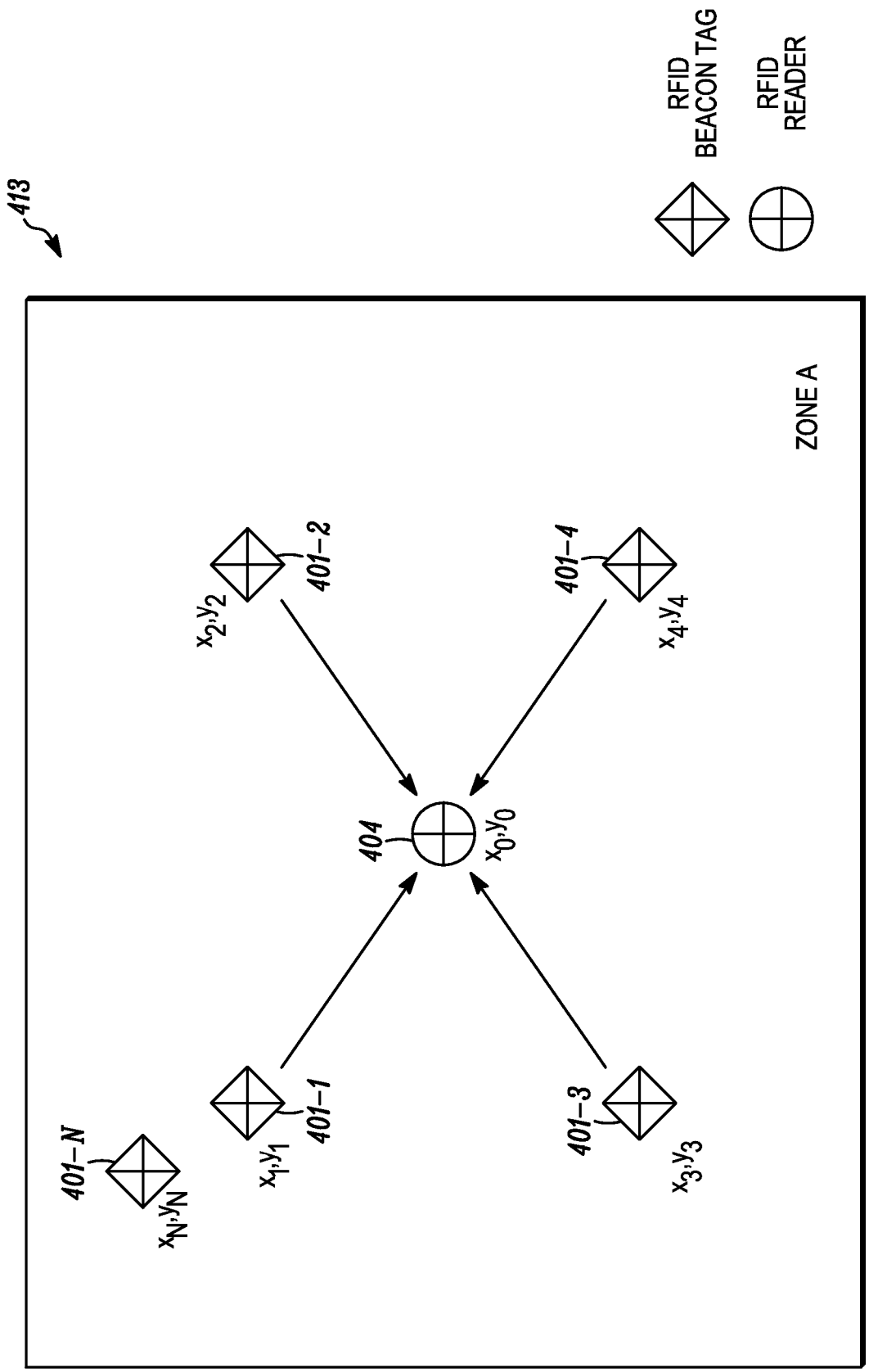
FIG. 4E illustrates the portion of the space or environment and response signals transmitted from some of the RFID beacon tags in response to an interrogation signal transmitted from the particular RFID reader at a particular transmit power.

FIG. 4D illustrates a flowchart of a method 450 for determining or defining read range for RFID readers based on feedback from RFID beacon tags present within a particular space or environment in accordance with some embodiments of the present disclosure. For example, method 450 can be performed by each RFID reader 104 that is present within a particular space or environment 110, but for ease of understanding will be described with respect to a single RFID reader in conjunction with FIGS. 4E-4F. At step 452, the RFID reader 404 transmits an interrogation signal at a particular transmit power. In response to the interrogation signal, any RFID tag within read range transmit a response signal to the RFID reader. The tags responding will also include the RFID beacon tags that are within the coverage range. For instance, in one example, FIG. 4E illustrates a portion 413 of the space or environment and response signals transmitted from some of the RFID beacon tags 401 in response to an interrogation signal transmitted from the particular RFID reader 404 at a particular transmit power. As illustrated in FIG. 4E, the RFID beacon tags 401-1, 401-2, 401-3, 401-4 are within range to the RFID reader 404 and therefore transmit response signals (represented by single-ended arrows) in response to an interrogation signal (not illustrated) transmitted by the RFID reader 404, whereas 401-N is outside the read range of the RFID reader 404 and does not receive the interrogation signal and therefore does nothing.

At step 454, the RFID reader determines, based on tag identifiers, which particular RFID beacon tags 401-1, 401-2, 401-3, 401-4 the particular RFID reader 404 received response signals from, and the positions of those particular RFID beacon tags 401-1, 401-2, 401-3, 401-4 based on the position information provided in the response signal or the known positions of those particular RFID beacon tags 401-1, 401-2, 401-3, 401-4, which are known a priori by the RFID reader 404.

In one exemplary implementation of the example illustrated in FIG. 4E, the RFID reader 404 determines that it received response signals from particular RFID beacon tags 401-1, 401-2, 401-3, 401-4, and from the response signals uses the RFID tag identifiers to identify those RFID beacon tags 401-1, 401-2, 401-3, 401-4. In addition, the response signals transmitted by RFID beacon tags 401-1, 401-2, 401-3, 401-4 can also include position information regarding the positions of those particular RFID beacon tags 401-1, 401-2, 401-3, 401-4, which the RFID reader 404 can use to determine the position of those particular RFID beacon tags 401-1, 401-2, 401-3, 401-4. Alternatively, the RFID reader 404 can determine the positions of those particular RFID beacon tags 401-1, 401-2, 401-3, 401-4 by looking up their coordinates in a table that lists tag identifiers versus position. In another implementation, the RFID reader 404 can determine the positions of the particular RFID beacon tags 401-1, 401-2, 401-3, 401-4 by looking up their coordinates in a table that lists tag identifiers versus position, and then compare position information provided in the response signals to the known position information from the table to confirm accuracy. It should be noted that the beacon tag position information can either be stored in the RFID reader's local memory, or it can be stored in the monitoring server's (or other central controller's) memory.

At step 456, based on the positions of the particular RFID beacon tags 401-1, 401-2, 401-3, 401-4 with respect to the RFID reader 404, the RFID reader 404 (or alternatively the monitoring server 106), can determine a coverage area that corresponds to the "read range" for the RFID reader 404 at the particular transmit power of the interrogation signal. Various alternative techniques can be used to define the zone.

Figure 4F:
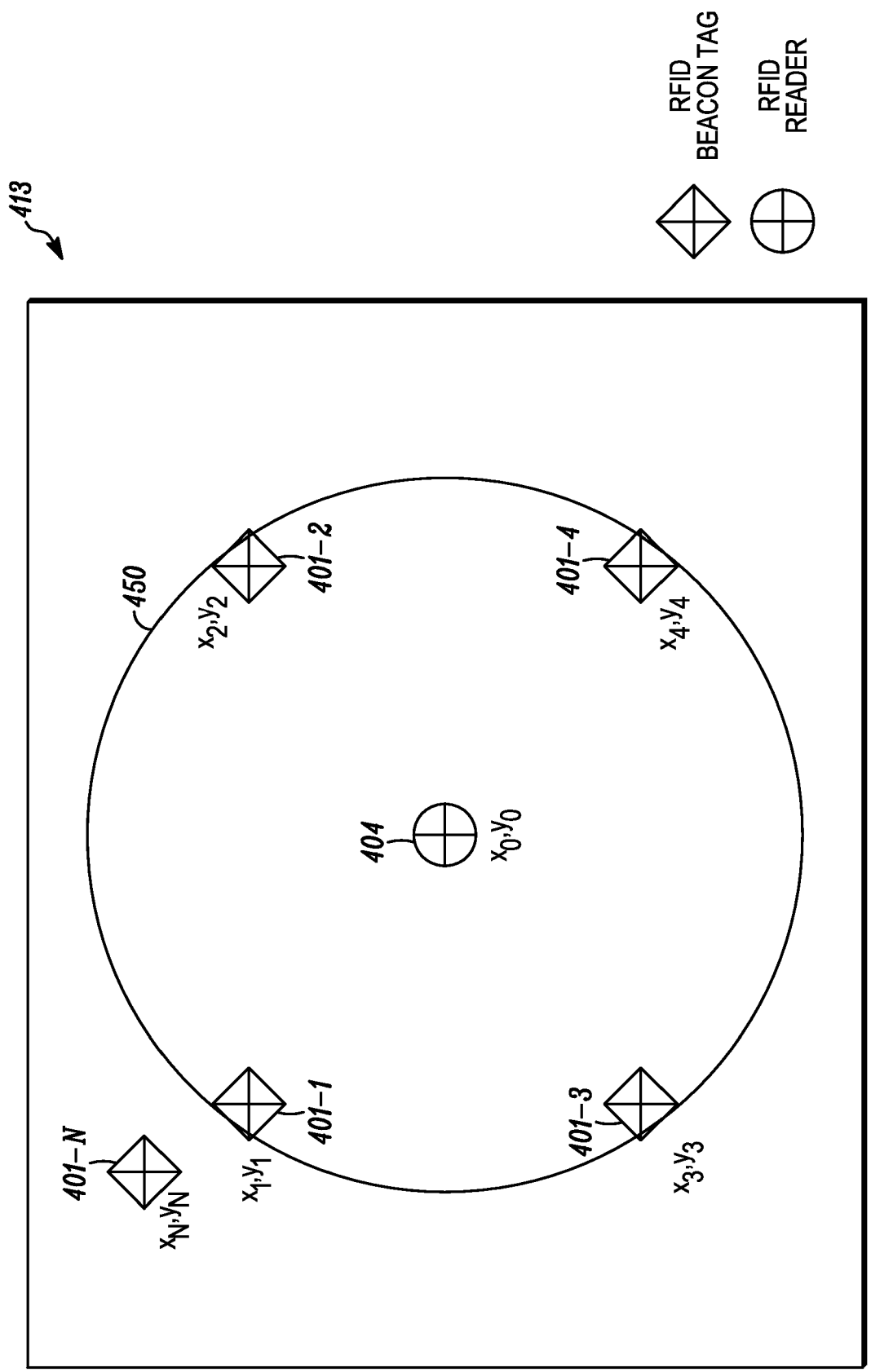
FIG. 4F illustrates the portion of the space or environment and a read range or coverage area of the particular RFID reader at the particular transmit power.

For instance, in one exemplary implementation, FIG. 4F illustrates a portion 413 of the space or environment and a read range or coverage area 450 of the particular RFID reader 404 at a particular transmit power. As illustrated in FIG. 4F, the RFID reader 404 can determine which of the particular RFID beacon tags 401-1, 401-2, 401-3, 401-4 is furthest away from the RFID reader 404 using subtraction, and the read range can be set to a radial distance equal to the distance between the RFID reader 404 and the one of the particular RFID beacon tag 401-1, 401-2, 401-3, 401-4 that is furthest away from the RFID reader 404. In this case the coverage area 450 will have a two-dimensional circular shape or define three-dimensional spherical volume. Moreover, although the first approximate coverage area 450 is not completely accurate, it can provide a very good approximation of the actual coverage area of the RFID reader. Moreover, when a greater number of RFID beacon tags are deployed, it is likely that more RFID beacon tags will be within the actual coverage area of the reader and as a result the first approximate coverage area 450 will better approximate the actual coverage area. As the number of RFID beacon tags that are within the coverage area increases, then it is likely that the estimate or approximate coverage area 450 that is calculated (and/or displayed) will have better precision and more closely approximate the actual coverage area. As mentioned above, each of the RFID readers 104 can perform steps 452-456 to define respective coverage areas for that RFID reader 104.

Figure 4G:
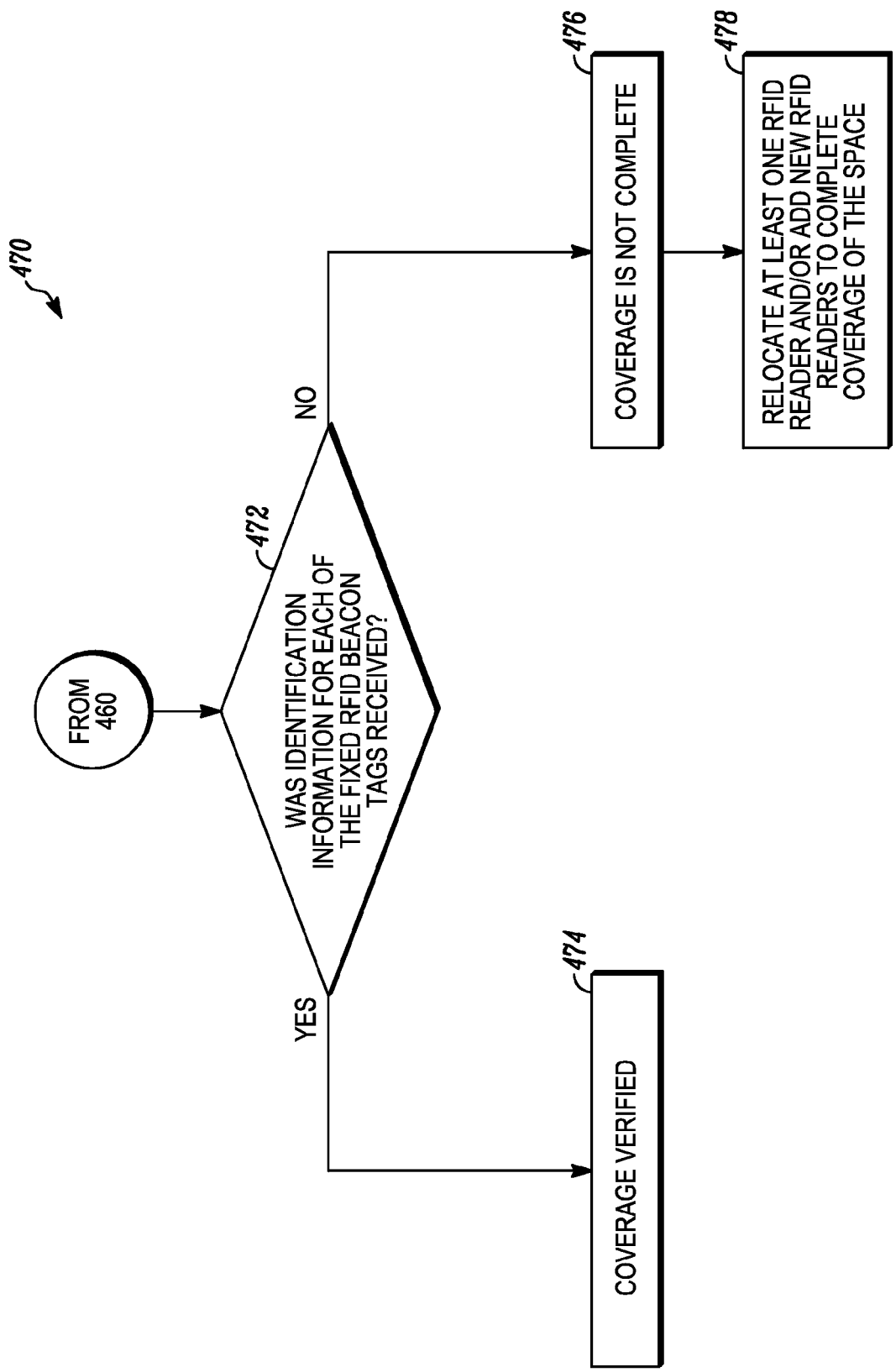
FIG. 4G illustrates a method for verifying RFID reader coverage of a space in accordance with some embodiments of the present disclosure.

FIG. 4G illustrates a method for verifying Radio Frequency Identification (RFID) reader coverage of a space in accordance with some embodiments of the present disclosure. In the implementation described at step 472, the monitoring server 106 can verify that the fixed RFID readers 104 provide full coverage of the space or environment 110 by determining whether identification information for all of the fixed RFID beacon tags 101 was received by at least one of the fixed RFID readers 104. If identification information was received for all of the fixed RFID beacon tags 101, then at step 474 the monitoring server 106 determines that the fixed RFID readers 104 provide full coverage of the space or environment 110 since this means that all of the fixed RFID beacon tags 101 have received at least one interrogation signal and transmitted a response signal that was received by at least one of the fixed RFID readers 104. By contrast, if identification information was not received for one or more of the fixed RFID beacon tags (either meaning that it did not transmit a response signal or that a response signal was not received by at least one of the fixed RFID readers 104), then at step 476 the monitoring server 106 determines that the fixed RFID readers 104 do not provide full coverage of the space or environment 110. At step 478, the monitoring server 106 can provide an indication that the readers should either be relocated or reconfigured or moved to provide full coverage of the space or environment 110, and/or an indication that additional readers should be added to the space or environment 110 to provide full coverage of the space or environment 110. The system can also include intelligence, and direct the user to place or move or "re-position" RFID readers at specific locations by displaying this information on the monitoring server 106. Once the RFID readers are relocated and/or new RFID readers are added, the monitoring server 106 can instruct the RFID readers 104 to transmit another interrogation signal, and then repeat the coverage verification process. This coverage verification process can be repeated until coverage is verified at step 474.

At this stage the system 100 is deployed and can generate a map of the space or environment 110 that will be described in more detail below. This map can be displayed as a GUI on the RFID readers or the monitoring server or communicated to other nomadic RFID readers (not illustrated in FIG. 1D).

Exemplary Methods for Determining Item Location Within a Space

In accordance with other embodiments of the present disclosure, an RFID system and methods are provided for determining locations of items within a space or environment 110 as will be described below with reference to FIGS. 5A and 5B. As will be described below, the RFID system can be used to determine item location within a space or environment 110 based on feedback from a fixed RFID reader 104 and fixed RFID beacon tags 101 within a coverage area or read range of that fixed RFID reader 104.

Figure 5A:
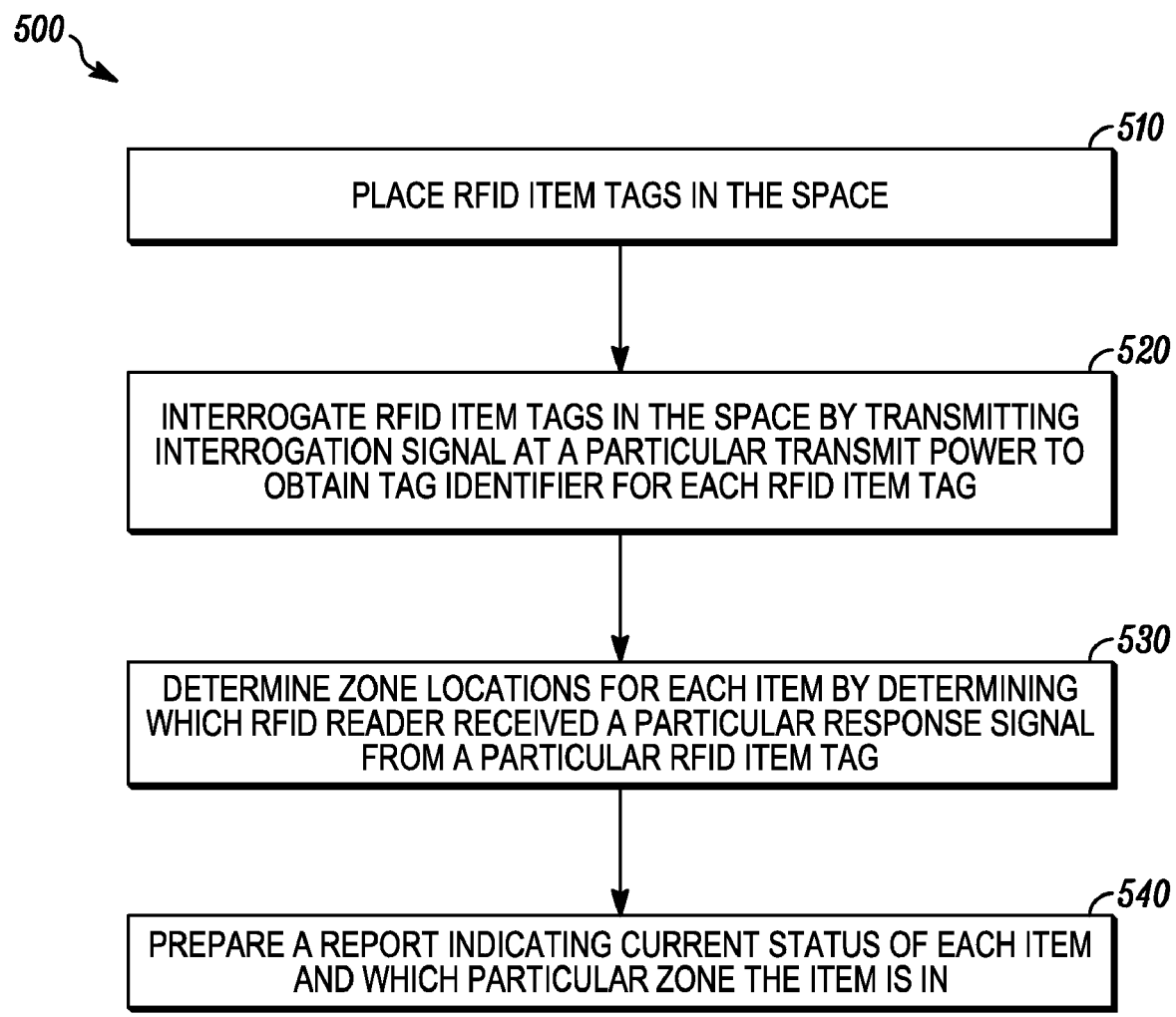
FIG. 5A illustrates a flowchart of a method for determining relative item location (RIL) based on feedback from RFID beacon tags in accordance with some other embodiments of the present disclosure.
Figure 5B:
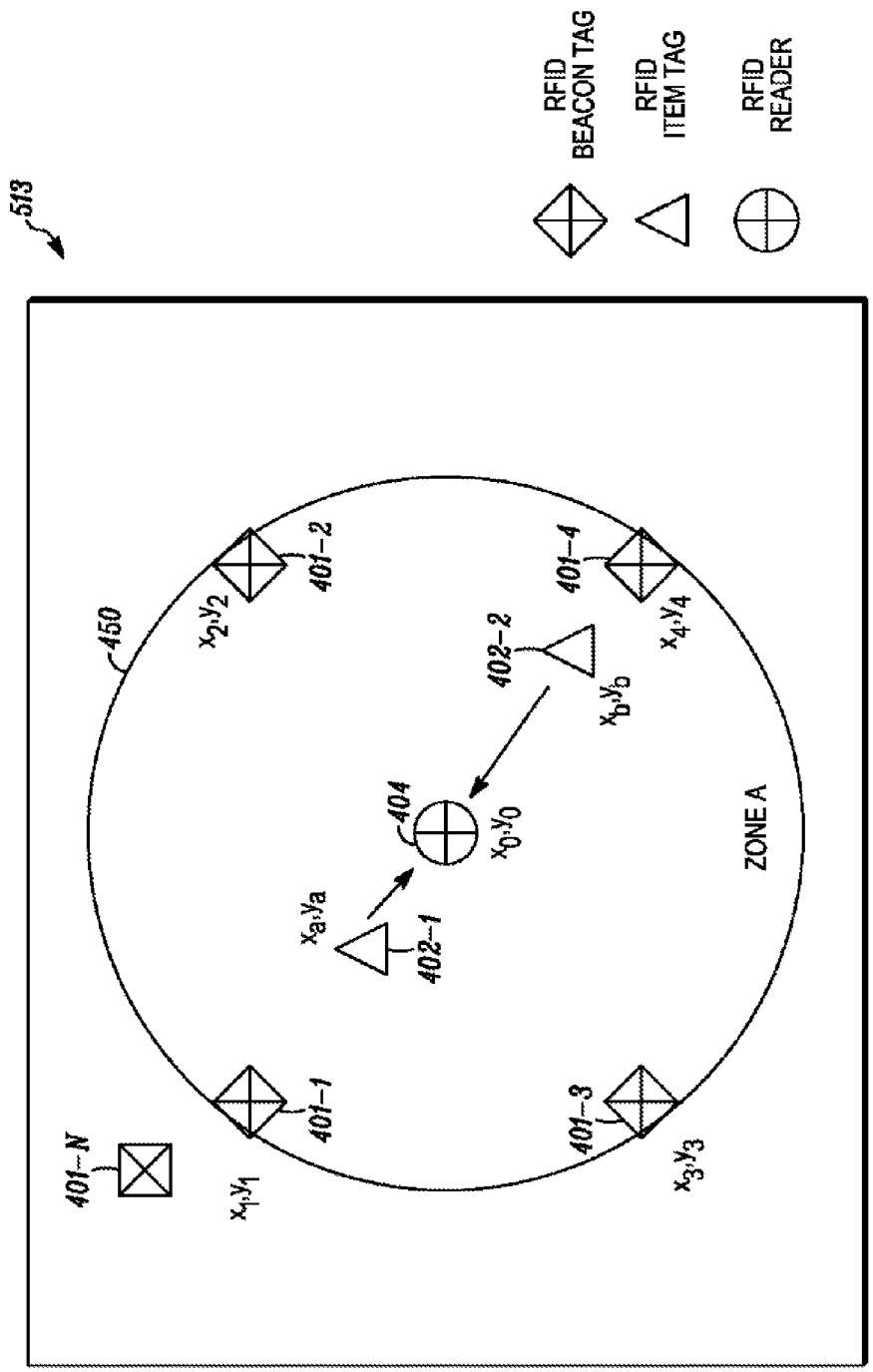
FIG. 5B illustrates the portion of the space or environment and locations of RFID beacon tags, the particular RFID reader and the relative coverage area locations of RFID item tags and in accordance with some embodiments of the present disclosure.

FIG. 5A illustrates a flowchart of a method 500 for determining relative item location (RIL) based on feedback from RFID beacon tags in accordance with some other embodiments of the present disclosure. FIG. 5A will be described below with reference to one exemplary, non-limiting implementation of a coverage map 513 that is illustrated in FIG. 5B.

At block 510, RFID item tags 102 placed in the environment 110 being monitored. Each of the RFID item tags 102 are attached to an item (e.g., an item of inventory or merchandise). At a minimum, the RFID item tags 102 are programmed to include information that identifies them (e.g., a tag identifier (ID)). In some implementations, the RFID item tags 102 can also be programmed with item data that describes details of the respective items with which the RFID item tags 102 are attached. Examples of the details of the items can include information such as, but not limited to: item description, price, discount, quality, and the like. The RFID item tags 102 can be either active devices having their own battery, or passive devices deriving power from the RFID readers 104. In the example illustrated in FIG. 5B, it is assumed that items with RFID item tags 402-1 and 402-2 are placed in a coverage area 450 that designates a read range for RFID reader 404.

At block 520, each of the fixed RFID readers 104 can transmit an interrogation signal, and can receive response signals from RFID beacon tags 101, 102 that are within their coverage area or "read range." The response signals generated by each tag include, at a minimum, identification information that identifies the tag (referred to below as a tag identifier (ID)), and can include other information such as that described above. For instance, the RFID beacon tags 101 can also include position information (e.g., coordinates that specify their particular locations within the space or environment) in their respective response signals although this information can also be knows a priori by the RFID readers and/or monitoring server 106.

For instance, in the example illustrated in FIG. 5B, upon receiving a first interrogation signal from the fixed RFID readers 404 (referred to below as a "first fixed RFID reader"), RFID item tags 402 within the read range can each transmit a response signal. In the example that is illustrated in FIG. 5B, the RFID reader 404 receives response signals (indicated using single-ended arrows) from RFID item tags 402-1, 402-2 that are located within its coverage area 450. Because the first fixed RFID reader 404 receives the response signals transmitted by the RFID item tags it can determine that the first RFID item tags 402 (and hence the items they are attached to) are located within a read range of the first fixed RFID reader 404. This read range is a first coverage area of the first fixed RFID reader 404 within a portion 513 of the space or environment 110.

As will be appreciated, other fixed RFID readers 104 that are placed at other known locations within the space or environment 110 and can perform the same methods to determine their read ranges or coverage areas. In addition, any other RFID tags that receive interrogation signals transmitted from other RFID readers 104 can also transmit a response signal, and any RFID readers 104 that receive a response signal can determine that the RFID tag that transmitted it is within its coverage area or "read range." For instance, a second fixed RFID reader can be provided at a second known location within the space or environment 110, and can transmit an interrogation signal, and another set of fixed RFID beacon tags and/or another set of RFID item tags can transmit response signals upon receiving this interrogation signal. A coverage area of the second fixed RFID reader can be defined based on the second known location of the second fixed RFID reader and another set of fixed RFID beacon tags, and it can be determined that this other set of RFID item tags are located within the coverage area of the second fixed RFID reader.

At block 530, each of the RFID readers determines "zone locations" for each item based on the particular RFID item tags that the particular reader received particular response signals from. The item locations are "relative" since it is known that the RFID item tags 402 are located somewhere within in coverage area 450; however, the precise location of the RFID item tags 402 within that coverage area 450 are not known.

Because readers 104 know which tag ID is associated with a particular RFID item tag 102 attached to it, the RFID readers 104 know which items are within its zone. For instance, in one implementation, whenever an inventory poll is required, the monitoring server 106 can direct the RFID readers 104 to interrogate the RFID item tags 102 to obtain some information related to the items to which the RFID item tags 102 are attached. The RFID readers 104 scan all items within their range by transmitting an interrogation signal to detect RFID item tags present in their coverage area or coverage area. For example, as illustrated in FIG. 5B, each of the RFID item tags 402 generate and transmit a response signal (indicated by single-ended arrows) that is received by the RFID reader 404. From the response signals sent by the RFID item tags 402, the RFID reader 404 can extract information regarding the tag IDs for the RFID item tags 402 that are attached to specific items, and thereby "knows" which items are within its read range. The same information can be provided to the monitoring server 106.

For example, in one implementation of block 530, each RFID reader 104 can extract the tag ID information from the response signals it receives from RFID item tags 102 within its communication range, and can wirelessly communicate the ID information for each RFID item tag 102 to the monitoring server 106. By sending tag IDs from the response signals it received, each RFID reader 104 can provide the monitoring server 106 with information that allows the monitoring server 106 to determine which RFID item tags 102 are within a particular coverage area defined by or that "corresponds to" a particular reader 104. This way the monitoring server 106 has a rough location estimate (RLE) or "coarse" approximation of which items are located in which coverage area within the space or environment 110 (i.e., knows which coverage area a particular item is located in). In some implementations, the system can have a map of the space or store with information about the location of the racks and shelves throughout the space or store. By knowing which shelf or rack is within the interrogation range of a particular RFID reader, the system can assume that the items interrogated by the particular RFID reader are located on that particular shelf. Of course, if more than one shelf is within the coverage area of a particular RFID reader, then the exact location of the particular item is more ambiguous.

At block 540, each of the RFID readers 104 (or alternatively the monitoring server 106) can prepare a report, called a coverage area record, which indicates the current status of each item and the particular coverage area each item is in. For instance, in the example that is illustrated in FIG. 5B, the RFID reader 404 can prepare a report, called a coverage area record, which indicates the current status of each item (identified by tags 402-1, 402-2) and the particular coverage area 450 each item (identified by tags 402-1, 402-2) is in. In addition, the monitoring server 106 can update the map with an identifier which indicates the coverage area that a RFID item tag for the particular item is located in. This identifier can be displayed anywhere within the coverage area (defined by the fixed RFID beacon tags) for that particular RFID reader 404 or as a list of identifiers within the coverage area.

In some implementations, a graphical user interface (GUI) embodied on a computer-readable medium (e.g., at a nomadic RFID reader or at a monitoring server or other computer) can display an interactive map of the space. This GUI can be displayed, for example, on a display of an RFID reader or on a display of another computer, such as a PC coupled to the monitoring server. The GUI can include a display area designed to display an interactive map of a particular portion of a space that the RFID reader is present in, a read range of the RFID reader and details regarding the RFID item tags located within the read range of the RFID reader. The GUI can include functionality that allows a user to select a portion of the map to obtain details regarding other the RFID item tags located within another particular portion of the space that is displayed on the interactive map. For example, the GUI can allow the operator/user to zoom in on a portion of the map to obtain more details regarding the items located within a particular portion of the space. For instance, when the space is in a store (or a portion of a store), a GUI can display a map of the store floor (or a portion of the store floor), and can allow the user to zoom in on a particular portion of the map to get more details regarding particular items that are located at a particular shelf or rack.

Although not illustrated in FIG. 5A, the RFID readers 104 can provide information regarding zones and items within specific zones to the monitoring server 106. Based on information received from the RFID readers 104, the monitoring server 106 maintains (i.e., regularly updates) a database that includes a variety of different records for each item (item records) and different records for each coverage area that is defined within the space or environment 110. One of these "item records" specifies the "current area" that a particular item is currently located in, the "desired area" that the particular item is desired to be located with, etc. One of the coverage area records the monitoring server 106 maintains for each coverage area is a list of the items currently present in each zone, a list of items that should be in each zone, etc.

In one implementation, the monitoring server 106 can prepare a report comprising item records and coverage area records based on the new RLE information for items located within a coverage area of each reader 104. For example, the monitoring server 106 can compare the new RLE information provided by a particular reader 104 with that specified in a prior coverage area record that is associated with that particular reader 104 and maintained by the monitoring server 106. To verify the items present in the space or environment 110 and zones they are present in, the monitoring server compares the current RLE information provided by the RFID readers 104 with the previous record that is stored in the database. The monitoring server can then determine whether each item is still within the coverage area specified by the prior record, and if not, can determine where it is located, if the item should be located there, if it was taken out of inventory (e.g., sold, damaged, returned to vendor, etc.) In some implementations, the database can be updated with information from other sources (e.g., information communicated from points of sale or registers, which provides information about items that have been bought and paid for, as well as from Electronic Article Surveillance (EAS) records, which presumably can track items that have left the store).

In some implementations, a processor in the monitoring server 106 (or in an RFID reader) includes searching functionality. This searching functionality allows a user/operator to input a specific item or items, and issue a command to search for a specific item or items using the fixed readers. In response to the command, each fixed RFID reader will transmit an interrogation signal to conduct a search for RFID item tags corresponding to the specific item or items, and the RFID reader or readers that receive a response signal from the corresponding RFID item tag or tags can then report back to the monitoring server whether the item or items was/were located within their coverage area.

In one implementation, the monitoring server 106 can also include RLE information for each item in a coverage area map. When a user of a particular nomadic RFID reader (not illustrated) is attempting to obtain information about where a specific item is located, the monitoring server 106 can provide a coverage area map that specifies this information by showing the item's relative location in the space or environment 110 (or within a part of the space or environment 110).

This RLE can be displayed on a querying RFID reader that is attempting to obtain information regarding items located within a portion of the space or environment 110. Although not illustrated in FIG. 5A, the portion 513 of the space or environment 513 that the RFID beacon tags 401, the particular RFID reader 404 and the relative item locations (RILs) of RFID item tags 402 are located within can be displayed on a display in accordance with some embodiments of the present disclosure.

The coverage area 450 is illustrated using a circle for purposes of convenience and illustrating one example embodiment, however, it should be appreciated that in most cases the coverage area or read range of an RFID reader does not have perfect circular shape. To the contrary, a coverage area will typically have a polygonal shape corresponding to the number of data points (i.e., RFID beacon tag positions) used to compute the coverage area or read range. In general, the coverage area can be any area or other space. In many cases it is convenient if the RFID reader is located at the center or centroid of the coverage area or read range, with the coverage area being an area or volume defined about that centroid. For example, in some implementations, the coverage area can be represented as an area or "in two-dimensional space," and this area can be expressed as a parametric function representing a discretized view of a plane. By contrast, in other implementations, the coverage area can be represented as a volume or "in three-dimensional space," and this volume can be represented as a matrix of values representing a discretized view of a space.

Defining Multiple Coverage Areas or Read Ranges for Each RFID Reader

In the examples described above, for simplicity of illustration and explanation, FIGS. 4B, 4C, 4E 4F and 5B describe a situation where a single read range or coverage area is determined for each RFID reader in the space or environment. However, it is to be appreciated that in some implementations, as will be described below with respect FIGS. 6A and 6B, that multiple read ranges can be defined for each RFID reader so that the RFID reader can determine which items fall within various zones of coverage by adjusting the transmit power of the interrogation signal (i.e., by transmitting other interrogation signals at a higher or lower transmit power) to define multiples "coverage areas" or "read ranges" that can be used to locate RFID item tags. The power of the interrogation signal can be changed either manually by the operator or the RFID reader or automatically by software operating on the RFID reader itself.

For example, after a particular fixed RFID reader has used the methods described above to establish a first coverage area or read range via a first interrogation signal transmitted at a "first" transmit power, the particular fixed RFID reader can transmit a "second" interrogation signal that has a lower transmit power than the first transmit power of the first interrogation signal to decrease its coverage area or read range. In response to the second interrogation signal, a "second set" of fixed RFID beacon tags and/or a second set of RFID item tags can transmit response signals. The second set of fixed RFID beacon tags will include at least some of the first set of fixed RFID beacon tags, and the second set of RFID item tags will include at least some of the first set of RFID item tags. Based on the known location of the particular fixed RFID reader and the known locations of the second set of fixed RFID beacon tags, a second coverage area of the particular fixed RFID reader can be defined (by either the particular fixed RFID reader or another entity such as the monitoring server 106), and it can be determined that the second set of RFID item tags are also located within the second coverage area of the particular fixed RFID reader.

By contrast, to increase its coverage area or read range, the particular fixed RFID reader can transmit a "third" interrogation signal that has a higher transmit power than the first transmit power of the first interrogation signal. In this case, a "third set" of fixed RFID beacon tags and/or a "third" set of RFID item tags can transmit response signals upon receiving the third interrogation signal, and the third set of fixed RFID beacon tags will include all of the first set of fixed RFID beacon tags possibly along with additional fixed RFID beacon tags, and the third set of RFID item tags will includes all of the first set of RFID item tags possibly along with additional RFID item tags. This is because the transmit power of the third interrogation signal is greater than the transmit power of the first interrogation signal, a third coverage area of the particular fixed RFID reader can be defined (by either the particular fixed RFID reader or another entity such as the monitoring server 106) based on the first known location of the particular fixed RFID reader and the third set of fixed RFID beacon tags, and it can be determined that the third set of RFID item tags are located within the third coverage area of the particular fixed RFID reader.

One such example of defining multiple coverage areas for a single RFID reader will now be described below with reference to FIGS. 6A and 6B.

Figure 6A:
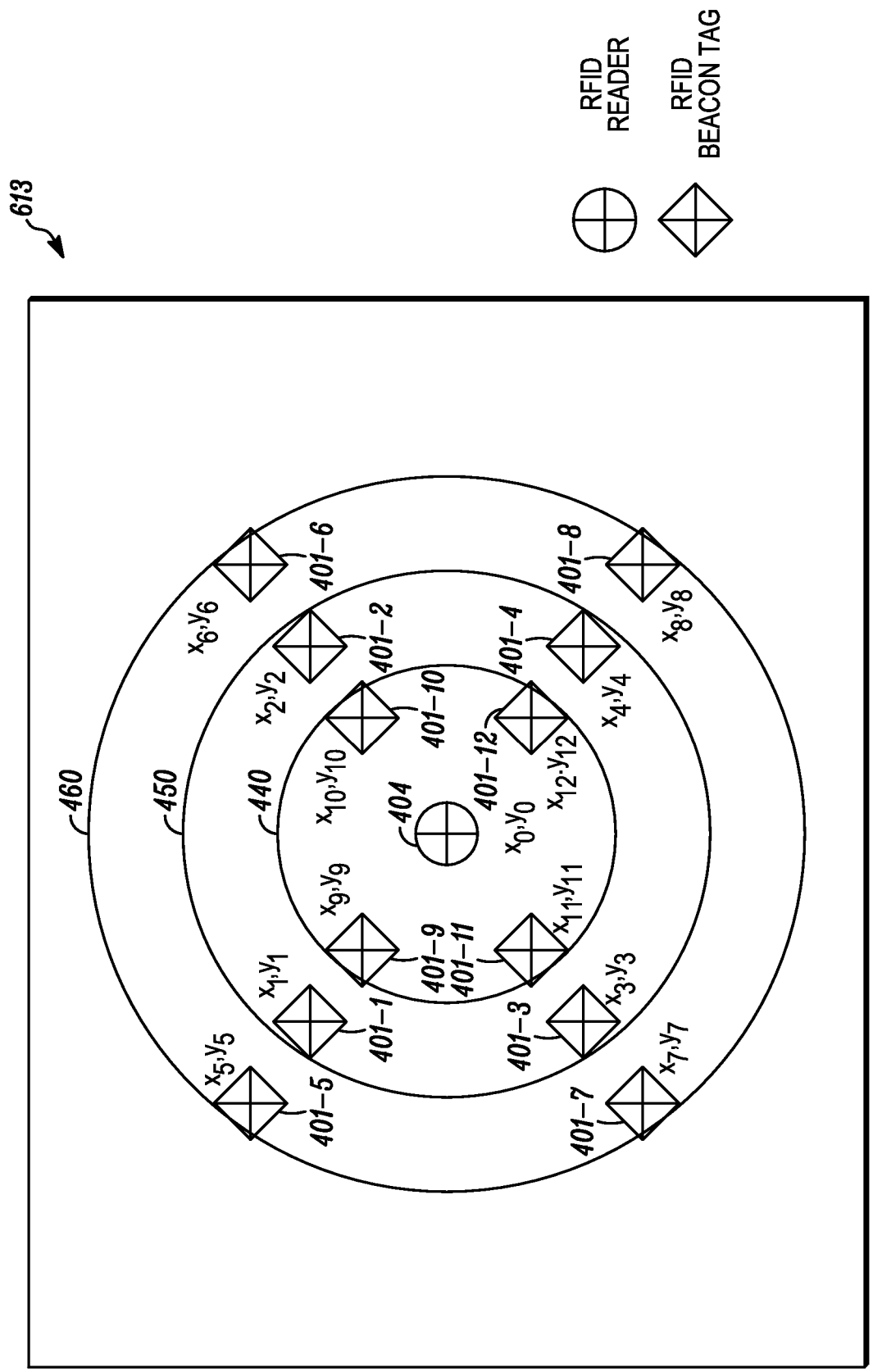
FIG. 6A illustrates the portion of the space or environment and various read ranges of a particular RFID reader in accordance with some other embodiments of the present disclosure.

FIG. 6A illustrates a portion 613 of the space or environment and various read ranges 440, 450, 460 of a particular RFID reader 404 in accordance with some other embodiments of the present disclosure.

In this particular example, three "read ranges" or coverage areas 440, 450, 460 have been defined for a particular RFID reader 404; however, a greater number or a lesser number of coverage areas can be defined in a particular implementation. The same applies for other RFID readers 104 in the space or environment 110. Each coverage area 440, 450, 460 corresponds to a read range defined for the particular RFID reader 404 at a particular transmit power (first transmit power for coverage area 450, second transmit power for coverage area 440, third transmit power for coverage area 460) of an interrogation signal generated by that particular RFID reader 440. After the read ranges or coverage areas 440, 450, 460 have been defined for the particular RFID reader 404 their corresponding coordinate information (that defines each read range or coverage area of the RFID reader 404) can be input into the map generation module (MGM), and the MGM updates the map of the space or environment 110 with the locations of each of the coverage areas for the RFID readers including the coverage areas 440, 450, 460 of the RFID reader 404.

The first read range or coverage area 450 can be established, for example, by performing steps 452-456 as described above—transmitting an interrogation signal from the particular RFID reader 404 at a first transmit power, determining which RFID beacon tags 401-1, 401-2, 401-3, 401-4, 401-9, 401-10, 401-11, 401-12 respond, and calculating the first coverage area 450 for that particular RFID reader 450 that corresponds to the first transmit power based on the positions of the RFID reader 404 and the positions of the RFID beacon tags 401-1, 401-2, 401-3, 401-4, 401-9, 401-10, 401-11, 401-12.

Additional "lower" read ranges or coverage areas can be defined by progressively decreasing transmit power. For example, a second read range or coverage area 440 can be established by decreasing the transmit power to a second transmit power, and transmitting an interrogation signal from the particular RFID reader 404 at the second transmit power. In most cases fewer/less RFID beacon tags respond to an interrogation signal transmitted at a lower transmit power than respond to an interrogation signal that is transmitted at a higher transmit power. In this case, only RFID beacon tags 401-9, 401-10, 401-11, 401-12 respond (i.e., are within range of the second interrogation signal). Therefore, only the positions of the RFID beacon tags 401-9, 401-10, 401-11, 401-12 are used to calculate the second coverage area 440 (that is also encompassed by the first coverage area 450) for the particular RFID reader 404. The second coverage area 404 is determined based on the position of the RFID reader 404 and the positions of the common RFID beacon tags 401-9, 401-10, 401-11, 401-12. This process sequence can be repeated to add/determine as many additional lower coverage areas as desired for each RFID reader.

Additional "upper" or "higher" read ranges or coverage areas can also be defined by progressively increasing transmit power. This can be done, for example, by increasing the transmit power to a third transmit power, and transmitting an interrogation signal from the particular RFID reader 404 at the third transmit power. In most cases more/additional RFID beacon tags 401-5, 401-6, 401-7, 401-8 respond (than responded to the interrogation signals transmitted at the first transmit power or the second transmit power). In this case, all of the RFID beacon tags 401 will respond, but only the positions of the RFID beacon tags 401-5, 401-6, 401-7, 401-8 (i.e., that did not respond to the interrogation signals transmitted a the lower transmit power or "have not yet responded" to an interrogation signal) are used to calculate the third coverage area 440 that encompasses by the first coverage area and the second coverage area for that particular RFID reader 404 based on the positions of the uncommon RFID beacon tags 401-5, 401-6, 401-7, 401-8 that are positioned furthest from the particular RFID reader 404. This process sequence can be repeated to add/determine as many additional upper/higher coverage areas as desired for each RFID reader 104.

As described above, coordinate information that defines the read ranges or coverage areas of the RFID reader 404 can be input into the map generation module (MGM), and the MGM updates the map of the space or environment 110 with the read ranges or coverage areas of each of the RFID readers including the RFID reader 404, and their respective coverage areas that define their read ranges. By adding more coverage areas 440, 450, 460, the precision of the coverage areas 440, 450, 460 that can be displayed on the map can be increased. This feature is particularly beneficial when locating RFID item tags since this allows the read range of the RFID readers to be iteratively adjusted so that the location of RFID item tags can be determined and displayed with greater precision depending on the particular one of the coverage areas the item falls within. Although the techniques described above describe generating three coverage areas, it is to be appreciated that any number of coverage areas can be defined using similar processing sequences.

When an RFID reader interrogates specific RFID item tags, the multiple coverage areas that have been determined can eventually be displayed on a coverage map on a display of that RFID reader to allow the user to determine the item's location with specificity. The coverage map can be displayed at different scopes of granularity depending on the area the user would like to observe on the display.

Figure 6B:
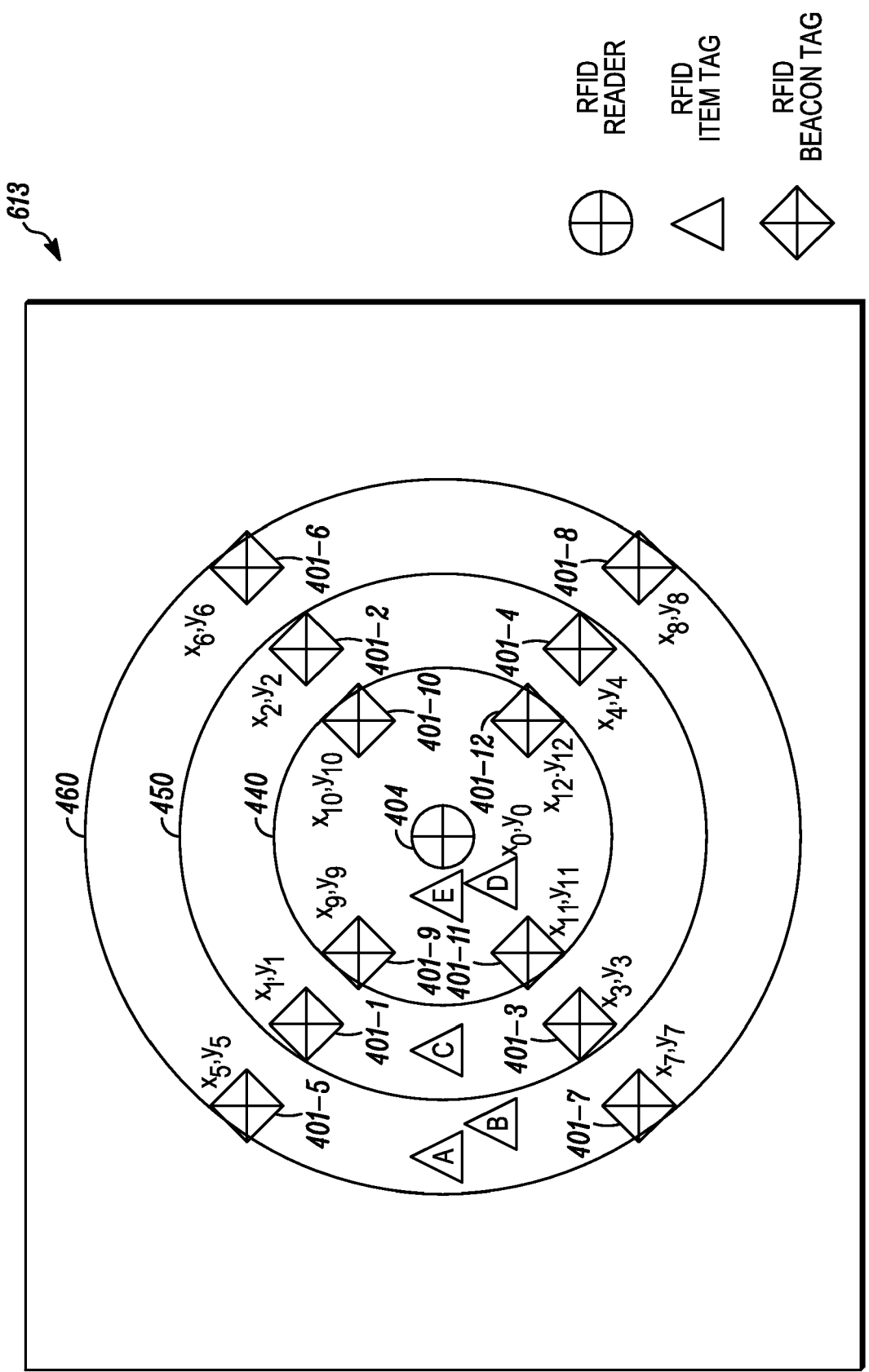
FIG. 6B illustrates the portion of the space or environment illustrated in FIG. 6A with RFID item tags A, B, C, D, E located within various read ranges of the particular RFID reader in accordance with some other embodiments of the present disclosure.

FIG. 6B illustrates a block diagram of the portion 613 of the space or environment illustrated in FIG. 6A with RFID item tags A, B, C, D, E located within various read ranges 440, 450, 460 of the particular RFID reader in accordance with some other embodiments of the present disclosure. In FIG. 6B, the RFID item tags are shown in capitalized letters without using any other specific identifier symbol. In this example, a situation where RFID item tags A, B, C, D, E are located within a read range or coverage area 460 of the RFID reader 404, RFID item tags C, D, E are located within a read range or coverage area 450 of the RFID reader 404, and RFID item tags D, E are located within a read range or coverage area 440 of the RFID reader 404.

In one embodiment, the coverage area that particular RFID item tags 402 are located in can be refined by iteratively adjusting transmit power of interrogation signals transmitted by the RFID reader 404 to the RFID item tags. For instance, with reference to the example illustrated in FIG. 6B, the RFID reader 404 can transmit a "high" power interrogation signal and determine which RFID item tags respond and are hence within a particular coverage area 460. In this example, all of the RFID item tags A, B, C, D, E within coverage area 460 would send a response signal and be added to a first set A, B, C, D, E. The RFID reader 404 can then reduce transmit power of the interrogation signal and determine which RFID item tags continue to respond. The RFID item tags that continue to respond to this reduced transmit power interrogation signal are closer to the RFID reader 404. The RFID item tags C, D, E that continue to respond to this reduced transmit power interrogation signal are within coverage area 450. The RFID reader 404 (or alternatively the monitoring server 106) can collect data regarding which RFID item tags responded to each interrogation signal, and use this data to precisely determine which pair of coverage areas a particular RFID item tag is located within. For example, the RFID reader can determine which RFID item tags lie within a region between two coverage areas by subtracting a set of RFID item tags that respond to a lower power interrogation signal from a set of RFID item tags that respond to a higher power interrogation signal. This can be useful when displaying the portion 613 of the space or environment 110 on a display as a partial map since the RFID item tags can be indicated as being between two particular coverage areas as opposed to being indicated as being within one particular coverage area. As such, the relative location of an item can be displayed with improved precision. For example, in the example shown in FIG. 6B, the operator of the RFID reader can understand that the RFID item tag C is located in a region defined between the coverage areas that is outside of coverage area 440, but within coverage area 450. At the same time, the operator does not know precisely which portion of the region that RFID item tag is within. By contrast, if only one coverage area 450 is displayed then the operator knows that RFID item tag C is anywhere within the coverage area 450, but can not visually rule out that RFID item tag C is not within a certain portion of 450.

Displaying Read Range of a Nomadic RFID Reader

As noted above, methods 400, 450 and 500 can also be applied in scenarios where the RFID readers are not fixed at known locations or positions, but are nomadic and can move or roam within the space or environment 110. In this situation, methods steps 430, 440 and 470 are not necessarily performed. Other embodiments of the present disclosure will now be described with reference to FIGS. 7 and 8.

Figure 7:
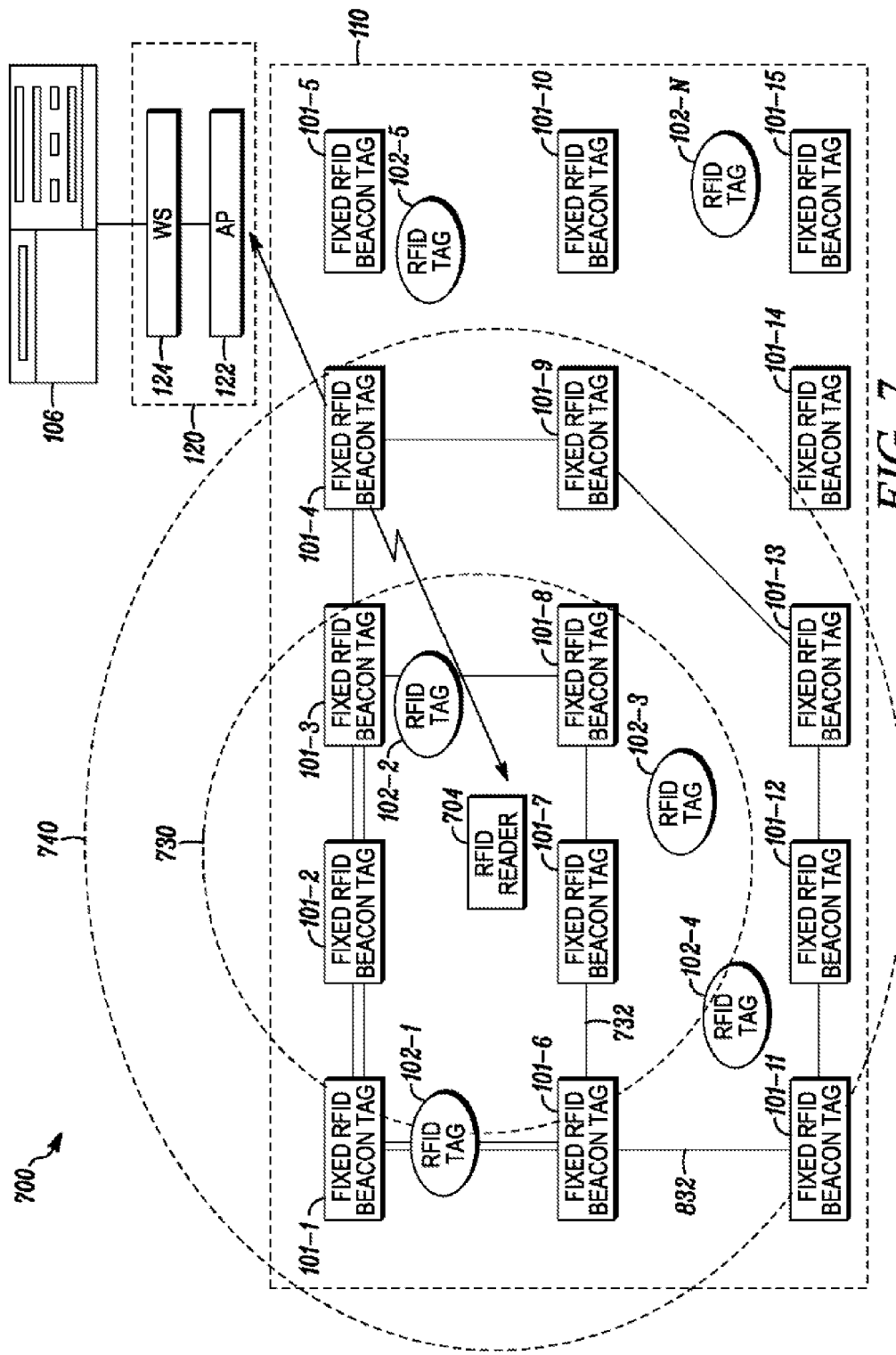
FIG. 7 illustrates an RFID system in accordance with some other embodiments of the present disclosure.

FIG. 7 illustrates an RFID system 700 in accordance with some other embodiments of the present disclosure. FIG. 7 includes many of the same devices 101, 102, 120, 106 as illustrated in FIG. 1D, but differs from FIG. 1 in that the fixed RFID readers 104-1 to 104-M are not present (although they can be in some implementations), and in that at least one nomadic RFID reader 704 is present. In FIG. 7, RFID reader 704 is not at fixed coordinates or at a known position or location within the space or environment 100, as are the fixed RFID readers 104-1 to 104-M of FIG. 1D, and has the ability to move about within the space or environment 110 and therefore its position can not be relied on as a fixed reference point. At the same time, it will be appreciated that any of the embodiments described above, such as those in FIGS. 6A-B, can also be applied in conjunction with embodiments that will now be described below with respect to FIGS. 7 and 8.

Figure 8:
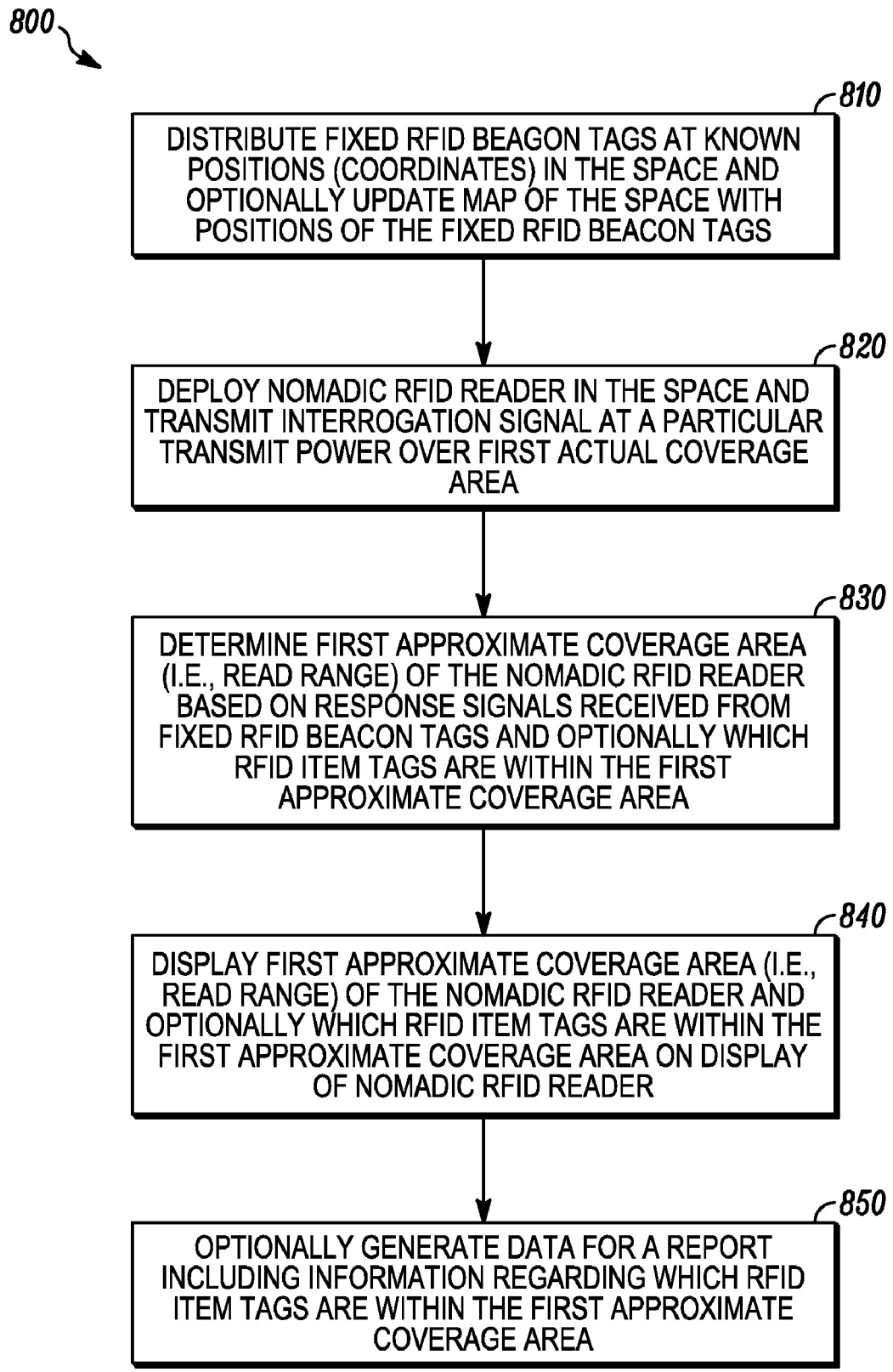
FIG. 8 is a flowchart illustrating a method for displaying information corresponding to an area being covered by an RFID interrogation signal transmitted from a nomadic RFID reader.

FIG. 8 is a flowchart illustrating a method 800 for displaying information corresponding to an area being covered by an RFID interrogation signal transmitted from the RFID reader 704 (or the "read range" of the RFID reader 704). Method 800 will be explained with reference to FIG. 7.

At step 810, fixed RFID beacon tags 101 are placed at known locations throughout a space or environment 110 (e.g., store). In addition, items, such as inventory, merchandise, etc, that have RFID item tags 102 attached thereto can also be placed in the space or environment 110. As noted above, each of the RFID beacon tags 101 is programmed with an identifier (ID number) and can be programmed with information regarding actual location/position/coordinates of that RFID beacon tag, and each of the RFID item tags 102 is programmed with an identifier and can be programmed with object data that describes the items that each of the particular RFID item tags is attached to.

At step 820, the RFID reader 704 can be deployed within the space or environment 110 and can transmit a first interrogation signal at a first transmit power from over a first actual coverage area 740 within the space or environment 110. Any fixed RFID beacon tags 101 and any RFID item tags 102 that are present within the first actual coverage area 740 being interrogated will respond to the interrogation signal with a response signal that includes an identifier or identification number. In some implementations, the response signals generated by the RFID beacon tags 101 will also include the location/position/coordinates of the RFID beacon tags 101, and the response signals generated by the RFID item tags 102 will also include object data describing the item they are attached to. In this particular example, in response to the first interrogation signal, a first group of the fixed RFID beacon tags 101-1, 101-2, 101-3, 101-4, 101-6, 101-7, 101-8, 101-9 101-11, 101-12, 101-13 and a first group of the RFID item tags 102-1, 102-2, 102-3, 102-4 that are within the first actual coverage area 740 can generate and transmit response signals that are received by the RFID reader 704.

Because the fixed RFID beacon tags 101 are at known locations or positions, at step 730, the RFID reader 704 (or another device such as monitoring server 106) can determine, based on the response signals received from the first group of the fixed RFID beacon tags 101-1, 101-2, 101-3, 101-4, 101-6, 101-7, 101-8, 101-9 101-11, 101-12, 101-13, the first approximate coverage area 832 of the first interrogation signal (also referred to as a "read range" of the RFID reader 704 corresponding to the first interrogation signal). The first approximate coverage area is defined by the fixed RFID beacon tags 101, and is illustrated in FIG. 7 as an irregular pentagon or five-sided polygon. The RFID reader 704 also receives response signals from the first group of the RFID item tags 102-1, 102-2, 102-3, 102-4 and therefore can determine (or assume) that the first group of the RFID item tags 102-1, 102-2, 102-3, 102-4 are also located within or near the first approximate coverage area 832 of the RFID reader 704. Any RFID item tags that also respond to the first interrogation signal must also be within the first approximate coverage area that is defined by the fixed RFID beacon tags 101.

For instance, in one implementation, the RFID reader 704, can determine the first approximate coverage area 832 of the first interrogation signal by determining, based on the received response signals, identification information corresponding for each of the first group of the fixed RFID beacon tags 101-1, 101-2, 101-3, 101-4, 101-6, 101-7, 101-8, 101-9, 101-11, 101-12, 101-13 and location information corresponding for each of the first group of the fixed RFID beacon tags 101-1, 101-2, 101-3, 101-4, 101-6, 101-7, 101-8, 101-9, 101-11, 101-12, 101-13, and then determine the first approximate coverage area 832 of the first interrogation signal based on this location information.

Alternatively, similar processing can be performed at other devices within the system 800 including devices that are not shown. For instance, in one implementation, the RFID reader 704 can communicate identification information obtained from the response signals to the monitoring server 106, and the monitoring server 106 can determine the first approximate coverage area 832 of the first interrogation signal based on identification information in the response signals and corresponding location information for each of the first group of the fixed RFID beacon tags 101-1, 101-2, 101-3, 101-4, 101-6, 101-7, 101-8, 101-9, 101-11, 101-12, 101-13. The monitoring server 106 can then provide display information to the RFID reader 704 regarding the first approximate coverage area 832 of the first interrogation signal. Again, the first approximate coverage area 832 of the first interrogation signal is determined based on the location information corresponding for each of the first group of the fixed RFID beacon tags 101-1, 101-2, 101-3, 101-4, 101-6, 101-7, 101-8, 101-9, 101-11, 101-12, 101-13. Thus, based upon which fixed RFID beacon tags 101 respond to the interrogation signal, the system can determine the "approximate" coverage area 832 being read (or "scanned" or "interrogated") by the RFID reader 704.

Although the first approximate coverage area 832 is not completely accurate, it can provide a very good approximation of the actual coverage area 740 of the RFID read. This is helpful to the operator of the RFID reader when attempting to locate an item tag. Moreover, when a greater number of RFID beacon tags are deployed, it is likely that more RFID beacon tags will be within the actual coverage area 740 of the reader and as a result the first approximate coverage area 832 will better approximate the actual coverage area 740. For instance, when three RFID beacon tags are within the actual coverage area 740, the first approximate coverage area 832 will be represented as a triangle, but when eight RFID beacon tags are within the actual coverage area 740, the first approximate coverage area 832 will be represented as an octagon, and when twelve RFID beacon tags are within the actual coverage area 740, the first approximate coverage area 832 will be represented as a dodecagon. As the number of RFID beacon tags that are within the coverage area 740 increases, then it is likely that the estimate or approximate coverage area 832 that is calculated (and/or displayed) will have better precision and more closely approximate the actual coverage area 740.

At step 840, the first approximate coverage area 832 of the RFID reader 704, which is defined by the first group of the fixed RFID beacon tags 101-1, 101-2, 101-3, 101-4, 101-6, 101-7, 101-8, 101-9, 101-11, 101-12, 101-13, can be displayed on a display of the RFID reader 704. For example, in one implementation, the first approximate coverage area 832 can be displayed on the display via a graphical user interface (GUI) embodied on a computer-readable medium and executable on a computer. In some implementations, the first approximate coverage area 832 of the RFID reader 704 can be displayed on the display as part of an overall map of the space or environment 110 to provide context to the operator of the RFID reader 704. In addition, in some embodiments, an image (e.g., picture or video) of the first approximate coverage area 832 of the RFID reader 704 can also be displayed on the display of the RFID reader 704. Displaying the first approximate coverage area 832 on the display of the RFID reader 704 provides the operator of RFID reader 704 with visual feedback so that the operator knows which area (defined by fixed RFID beacon tags 101) is being scanned/read/interrogated by the first interrogation signal generated by the RFID reader 704. Alternatively, the coverage area 832 can be displayed on a computer (e.g., a personal computer (PC)) that is communicating with the reader 704 or the monitoring server 106.

Moreover, in some embodiments, identifiers for the RFID item tags 102-1, 102-2, 102-3, 102-4 that are located within the first approximate coverage area 832 of the RFID reader 704 can be displayed on the display of the RFID reader 704 to identify the corresponding items that are located within the first approximate coverage area 832 of the RFID reader 704. For example, in one implementation, identifiers of items and/or RFID items tags that are within the coverage area can be displayed to indicate the relative locations of items in the space or environment 110. Thus, for example, when polling is done to interrogate RFID item tags (e.g., on shelves) in a space or environment 110 or environment, the RFID reader 704 can display feedback of the generalized coverage area (defined by fixed RFID beacon tags 101 being read by the RFID reader 704) to generally show which RFID items tags are located within the first approximate coverage area. This way, the operator of RFID reader 704 knows which RFID item tags 102-1, 102-2, 102-3, 102-4 are within that general coverage area. In addition, other components of the system, such as the monitoring server, can use data to generate reports that indicate which RFID item tags are within a particular first approximate coverage area 832.

At optional step 850, the system 800 (e.g., the monitoring server 106 or reader 704) can generate data regarding which RFID item tags 102-1, 102-2, 102-3, 102-4 are within the first actual coverage area 740 (or alternatively with the first approximate coverage area 832).

Although FIGS. 6A and 6B are described before FIGS. 7 and 8, it is noted that FIGS. 6A and 6B (and their corresponding descriptions) are also particularly relevant with respect to embodiments described in FIGS. 7 and 8. The RFID reader 704 can adjust (increase or decrease) its transmit power and transmit additional interrogation signals to either expand or refine the actual coverage area being interrogated by the RFID reader 704 to make the approximate coverage area defined by RFID beacon tags within range of that interrogation signal either larger (or less precise) or smaller (or more precise). This technique can be used to increase or decrease the number of RFID item tags 101 encompassed by the coverage area. The power adjustment can be done manually by the user, or automatically by the RFID reader, for instance, based on some pre-defined criteria, such as reading a particular shelf only. An example will now be described with respect to FIG. 8, where the RFID reader 704 decreases its transmit power and transmits a "second interrogation signal" to refine the actual coverage area 730 being interrogated by the RFID reader 704 to make the approximate coverage area 732 defined by fixed RFID beacon tags 101-2, 101-3, 101-7, 101-8 (within range of the second interrogation signal) smaller (or more precise) and thus decrease the number of RFID item tags 102-2, 102-3 encompassed by the actual coverage area 730.

In the example illustrated in FIG. 7, when the RFID reader 704 transmits the second interrogation signal at a reduced transmit power, the second interrogation signal is received by a second group of fixed RFID beacon tags 101-1, 101-2, 101-3, 101-6, 101-7, 101-8 and a second group of RFID item tags 102-1, 102-2, 102-3 that are within a second actual coverage area 730 within the space or environment 110. Therefore, upon receiving response signals from the second group of fixed RFID beacon tags 101-1, 101-2, 101-3, 101-6, 101-7, 101-8 and the second group of RFID item tags 102-1, 102-2, 102-3 that are within the second actual coverage area 730, the RFID reader 704 (or alternatively the monitoring server 106) can determine the corresponding known positions/locations/coordinates of the second group of fixed RFID beacon tags 101-1, 101-2, 101-3, 101-6, 101-7, 101-8 and a second approximate coverage area 732 of the second interrogation signal that is defined by the second group of the fixed RFID beacon tags 101. This second approximate coverage area 732 can then be displayed on the display of the RFID reader 704 along with identifiers for the second group of RFID item tags 102-1, 102-2, 102-3 to identify the items located within the second approximate coverage area 732 of the RFID reader 704. In FIG. 7, the second approximate coverage area 732 is illustrated as a rectangle defined by the second group of fixed RFID beacon tags 101-1, 101-2, 101-3, 101-6, 101-7, 101-8. The examples illustrated in FIG. 7 show two examples of approximate coverage areas 732, 832. It should be appreciated that the reader 704 does not necessarily need to be at the center of these approximate coverage areas 732, 832, but somewhere within the approximate coverage areas. Moreover, the coverage areas do not need to have perfect geometric shapes; the shape of the coverage areas can be computed based on information regarding antenna radiation patterns, etc.

Moreover, in other implementations that are not illustrated, the coverage map can include other useful information. For instance, in one implementation, the input device can include an imaging device (not illustrated), such as a camera, that can be used to take a real time image (e.g., picture) of an area covered by the imaging device of the RFID reader. The coverage map that is generated can be displayed with (e.g., overlying) a real time image (e.g., picture) of the coverage map. For instance, in one implementation, the coverage map that is generated can be displayed on a display screen of an RFID reader overlying a real time image/picture that corresponds to the area covered by the coverage map. This way, the operator of the RFID reader has visual feedback of the read range or coverage area of the RFID reader along with a real time image that provides visual cues regarding the surrounding read range. In one implementation, the coverage area can be updated in real time as the nomadic RFID reader moves around the space or environment and interrogates different RFID beacon tags (or "different sets or groups of RFID beacon tags.")

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:
1. A method, comprising:
  transmitting an interrogation signal from a nomadic Radio Frequency Identification (RFID) reader over an actual coverage area within a space, wherein the space includes a plurality of fixed RFID beacon tags at known locations;

receiving, at the nomadic RFID reader, response signals from one or more fixed RFID beacon tags in the actual coverage area;

determining, based on the response signals and the known locations of the one or more fixed RFID beacon tags, an approximate coverage area of the interrogation signal; and displaying the approximate coverage area of the nomadic RFID reader on a display, wherein the approximate coverage area displayed on the display is defined by the one or more fixed RFID beacon tags that responded to the interrogation signal.

2. A method according to claim 1, wherein the step of determining, based on the response signals and the known locations of the one or more fixed RFID beacon tags, an approximate coverage area of the interrogation signal, comprises:

determining, at the nomadic RFID reader based on the response signals and the known locations of the one or more fixed RFID beacon tags, the approximate coverage area of the interrogation signal.

3. A method according to claim 2, wherein the step of determining, at the nomadic RFID reader based on the response signals and the known locations of the one or more fixed RFID beacon tags, the approximate coverage area of the interrogation signal, comprises:

determining, at the nomadic RFID reader for each of the received response signals, identification information corresponding to each of the one or more fixed RFID beacon tags;

determining, at the nomadic RFID reader based on the identification information, location information corresponding to each of the one or more fixed RFID beacon tags;

determining, at the nomadic RFID reader, the approximate coverage area of the interrogation signal based on the location information corresponding to each of the one or more fixed RFID beacon tags.

4. A method according to claim 1, wherein the step of determining, based on the response signals and the known locations of the one or more fixed RFID beacon tags, an approximate coverage area of the interrogation signal, comprises:

communicating information regarding the response signals from the nomadic RFID reader to a monitoring server; and determining, at the monitoring server, the approximate coverage area of the interrogation signal based on the response signals; and providing, from the monitoring server to the nomadic RFID reader, display information regarding the approximate coverage area of the interrogation signal, wherein the approximate coverage area of the interrogation signal is based on location information corresponding to each of the one or more fixed RFID beacon tags.

5. A method according to claim 4, wherein the step of determining, at the monitoring server, the approximate coverage area of the interrogation signal based on the response signals, comprises:

determining, at the monitoring server for each of the received response signals, identification information corresponding for each of the one or more fixed RFID beacon tags;

determining, at the monitoring server based on the identification information, location information corresponding for each of the one or more fixed RFID beacon tags; and determining, at the monitoring server, the approximate coverage area of the first interrogation signal based on the location information corresponding for each of the one or more fixed RFID beacon tags;

communicating, from the monitoring server to the nomadic RFID reader, information that indicates the approximate coverage area of the nomadic RFID reader and location information corresponding to each of the one or more fixed RFID beacon tags; and displaying, on a display of the nomadic RFID reader, a map of the space that comprises:

the approximate coverage area of the nomadic RFID reader and location information corresponding to each of the one or more fixed RFID beacon tags.

6. A method according to claim 1, further comprising:

placing items in the space, the items each having RFID item tags attached thereto;

receiving, at the nomadic RFID reader, response signals from the RFID item tags in the actual coverage area that are attached to items; and displaying, on a display, information associated with the first RFID item tag that is located within the first approximate coverage area of the nomadic RFID reader to identify the first item as being located within the first approximate coverage area of the nomadic RFID reader.

7. A method according to claim 1, further comprising:

displaying, on the display, an image of the approximate coverage area of the nomadic RFID reader.

8. A method according to claim 7, wherein the image of the approximate coverage area of the nomadic RFID reader is a picture image of the first approximate coverage area of the nomadic RFID reader.

9. A method according to claim 7, wherein the image of the approximate coverage area of the nomadic RFID reader is a video image of the approximate coverage area of the nomadic RFID reader.

10. A method according to claim 1, further comprising:

transmitting, from the nomadic RFID reader as the nomadic RFID reader moves about within the space, a second interrogation signal over a second actual coverage area within the space;

receiving, at the nomadic RFID reader, response signals from a second group of the fixed RFID beacon tags in the second actual coverage area and other response signals from other RFID item tags in the second actual coverage area that are attached to other items;

determining, based on the known locations of the second group of fixed RFID beacon tags, a second approximate coverage area of the second interrogation signal based on the response signals from the second group of the fixed RFID beacon tags; and displaying, on the display, the second approximate coverage area of the nomadic RFID reader and information associated with the other RFID item tags that are located within the second approximate coverage area of the nomadic RFID reader to identify the other items located within the second approximate coverage area of the nomadic RFID reader, wherein the second approximate coverage area displayed on the display is defined by the second group of the fixed RFID beacon tags.

11. A method according to claim 1, wherein the step of displaying the approximate coverage area of the nomadic RFID reader on a display, comprises:

displaying the approximate coverage area of the nomadic RFID reader with a map of the space on the display of the nomadic RFID reader.

12. A method according to claim 5, wherein the step of displaying the approximate coverage area of the nomadic RFID reader on a display, comprises:
- displaying, on a display of the monitoring server, the approximate coverage area of the nomadic RFID reader and location information corresponding to each of the one or more fixed RFID beacon tags with a map of the space.

13. A method according to claim 1, wherein each of the RFID beacon tags is programmed with an identifier and information regarding actual location of that RFID beacon tag.

14. A method according to claim 6, wherein each of the RFID item tags is programmed with an identifier and object data that described items the particular RFID item tag is attached to.

15. A method according to claim 1, wherein the interrogation signal is a first interrogation signal transmitted from the nomadic RFID reader at a first transmit power, wherein the one or more fixed RFID beacon tags in the actual coverage area comprises a first set of fixed RFID beacon tags in a first actual coverage area, and wherein the step of receiving, at the nomadic RFID reader, response signals from one or more fixed RFID beacon tags in the actual coverage area, comprises:
- receiving, at the nomadic RFID reader, a response signal from each of the first set of fixed RFID beacon tags and from each of a first set of RFID item tags upon receiving the first interrogation signal, wherein each of the fixed RFID beacon tags are fixed at first known locations in the first actual coverage area and, wherein the first set of RFID item tags comprises a first RFID item tag; and
- wherein the step of determining, based on the response signals and the known locations of the one or more fixed RFID beacon tags, an approximate coverage area of the interrogation signal, comprises
- defining a first approximate coverage area of the first interrogation signal based on the first known locations of the first set of fixed RFID beacon tags; and
- determining that the first set of RFID item tags are located within the first approximate coverage area of the nomadic RFID reader.

16. A method according to claim 15, further comprising:
- transmitting a second interrogation signal from the nomadic RFID reader, wherein the second interrogation signal has a lower transmit power than the first transmit power;
- transmitting response signals from a second set of fixed RFID beacon tags and from a second set of RFID item tags upon receiving the second interrogation signal, wherein the second set of fixed RFID beacon tags are fixed at other known locations, wherein the second set of fixed RFID beacon tags includes at least some of the first set of fixed RFID beacon tags, and wherein the second set of RFID item tags includes at least some of the first set of RFID item tags;
- defining a second coverage area of the nomadic RFID reader based on the other known locations of the second set of fixed RFID beacon tags; and
- determining that the second set of RFID item tags are located within the second coverage area of the nomadic RFID reader.

17. A method according to claim 16, further comprising:
- transmitting a third interrogation signal from the nomadic RFID reader, wherein the third interrogation signal has a higher transmit power than the first transmit power;
- transmitting response signals from a third set of fixed RFID beacon tags and from a third set of RFID item tags upon receiving the third interrogation signal, wherein the third set of fixed RFID beacon tags are fixed at known locations, wherein the third set of fixed RFID beacon tags includes all of the first set of fixed RFID beacon tags, and wherein the third set of RFID item tags includes all of the first set of RFID item tags;
- defining a third coverage area of the nomadic RFID reader based on the known locations of the third set of fixed RFID beacon tags; and
- determining that the third set of RFID item tags are located within the third coverage area of the nomadic RFID reader.

18. A nomadic Radio Frequency Identification (RFID) reader, comprising:
- a transmitter designed to transmit an interrogation signal at a transmit power over a actual coverage area within a space, wherein the space includes a plurality of fixed RFID beacon tags at known locations;
- a receiver designed to receive response signals from a group of fixed RFID beacon tags in the actual coverage area;
- a processor designed to determine, based on the response signals and the known locations of the group of fixed RFID beacon tags, an approximate coverage area of the interrogation signal that corresponds to and is defined by the known locations of the group of fixed RFID beacon tags; and
- a display designed to display a map of the space and the approximate coverage area within the space of the first interrogation signal transmitted by the nomadic RFID reader, wherein the approximate coverage area that is displayed corresponds to and is defined by the known locations of the group of the fixed RFID beacon tags.

19. A nomadic RFID reader according to claim 18, wherein the processor is further designed to determine identification information corresponding to each of the first group of the fixed RFID beacon tags from each of the received response signals, corresponding location information for each of the first group of the fixed RFID beacon tags, and the approximate coverage area of the first interrogation signal based on the location information corresponding to each of the first group of the fixed RFID beacon tags.

20. A nomadic RFID reader according to claim 18, wherein the transmitter is further designed to communicate information regarding the response signals to a monitoring server, and where the monitoring server is designed to: determine the approximate coverage area of the first interrogation signal based on the response signals, wherein the approximate coverage area of the first interrogation signal is based on location information corresponding for each of the first group of the fixed RFID beacon tags, and
- wherein the receiver is designed to receive display information generated by the monitoring server describing the approximate coverage area of the first interrogation signal.

21. A nomadic RFID reader according to claim 18, wherein the space includes one or more items, each having RFID item tags attached thereto including an RFID item tag that is attached to an item located in the actual coverage area, and wherein:
- the receiver is further designed to receive a response signal from the RFID item tag,
- the display is further designed to display information associated with the RFID item tag that is located within the approximate coverage area of the nomadic RFID reader to identify the item as being located within the approximate coverage area of the nomadic RFID reader.

22. A nomadic RFID reader according to claim 18, further comprising:
an imaging device designed to generate an image of the approximate coverage area of the nomadic RFID reader; and
wherein the display is further designed to display the image of the approximate coverage area of the nomadic RFID reader.

23. A method for displaying read range of a nomadic Radio Frequency Identification (RFID) reader based on feedback from fixed RFID beacon tags, the method comprising:
transmitting a first interrogation signal from the nomadic RFID reader within a space that includes a plurality of fixed RFID beacon tags at known locations;
receiving, at the nomadic RFID reader, response signals from a group of the fixed RFID beacon tags;
determining, based on known locations of the group of fixed RFID beacon tags, a read range of the nomadic RFID reader that is defined by the group of the fixed RFID beacon tags; and
displaying the read range of the nomadic RFID reader on a display.

24. A method according to claim 23, wherein the step of displaying the approximate coverage area of the nomadic RFID reader on a display, comprises:
displaying the approximate coverage area of the nomadic RFID reader with a map of the space on a display of the nomadic RFID reader.

25. A method according to claim 23, wherein the step of displaying the approximate coverage area of the nomadic RFID reader on a display, comprises:
displaying the approximate coverage area of the nomadic RFID reader with a map of the space on a display of a monitoring server.

* * * * *

UNITED STATES PATENT AND TRADEMARK OFFICE
CERTIFICATE OF CORRECTION

| | | |
|---|---|---|
| PATENT NO. | : 8,258,953 B2 | |
| APPLICATION NO. | : 12/369838 | |
| DATED | : September 4, 2012 | |
| INVENTOR(S) | : Miklos Stern and Benjamin Bekritsky | |

It is certified that error appears in the above-identified patent and that said Letters Patent is hereby corrected as shown below:

On the title page, item [75];

Inventor Benjamin Bekrisky's last name should read --Bekritsky--

Signed and Sealed this
Twenty-third Day of October, 2012

David J. Kappos
*Director of the United States Patent and Trademark Office*

UNITED STATES PATENT AND TRADEMARK OFFICE
CERTIFICATE OF CORRECTION

Page 1 of 1

PATENT NO. : 8,258,953 B2
APPLICATION NO. : 12/369838
DATED : September 4, 2012
INVENTOR(S) : Stern et al.

It is certified that error appears in the above-identified patent and that said Letters Patent is hereby corrected as shown below:

In Fig. 8, Sheet 19 of 19, for Tag "810", in Line 1, delete "BEAGON" and insert -- BEACON --, therefor.

In Column 3, Line 55, delete "shelf" and insert -- shelf. --, therefor.

In Column 12, Line 33, delete "RIFD" and insert -- RFID --, therefor.

In Column 18, Line 3, delete "Deployment Coverage Map Generation" and insert -- Deployment, Coverage Map Generation, --, therefor.

In Column 19, Line 4, delete "RIFD" and insert -- RFID --, therefor.

In Column 29, Line 23, delete "a" and insert -- at --, therefor.

In Column 37, Line 35, in Claim 15, delete "signal , comprises" and insert -- signal, comprises: --, therefor.

Signed and Sealed this
Fifth Day of February, 2013

Teresa Stanek Rea
*Acting Director of the United States Patent and Trademark Office*